Dec. 20, 1966  R. G. HINTZ  3,293,422
BORROW PYRAMID HAVING SIMULTANEOUS BORROW
GENERATION AND NORMALIZE SYSTEM
Filed June 4, 1963  20 Sheets-Sheet 1
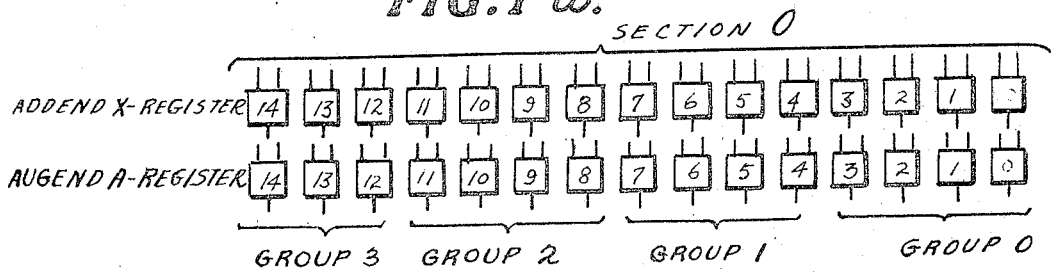
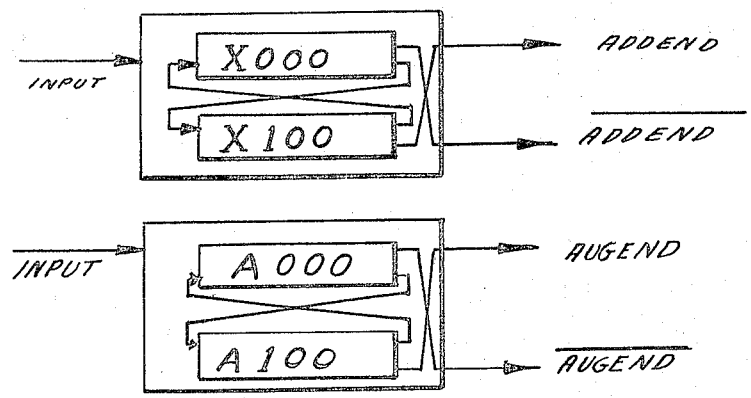
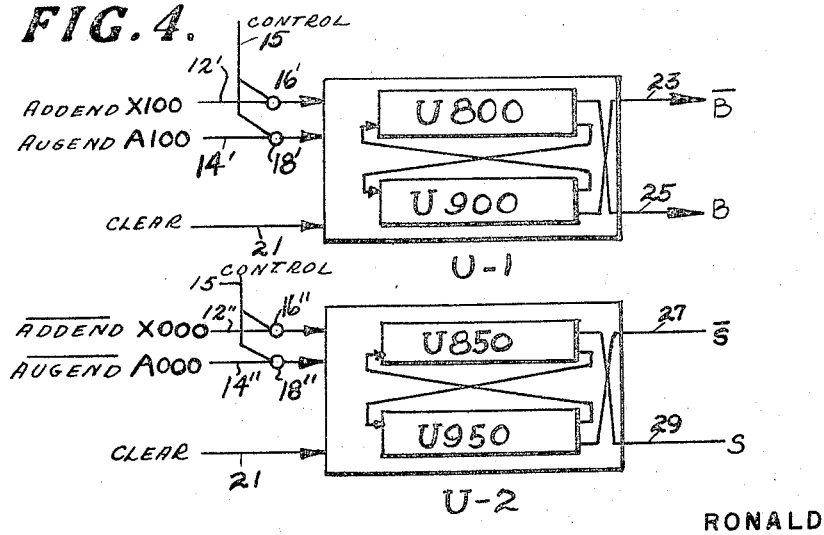
INVENTOR
RONALD G. HINTZ
BY Cushman, Darby & Cushman
ATTORNEYS

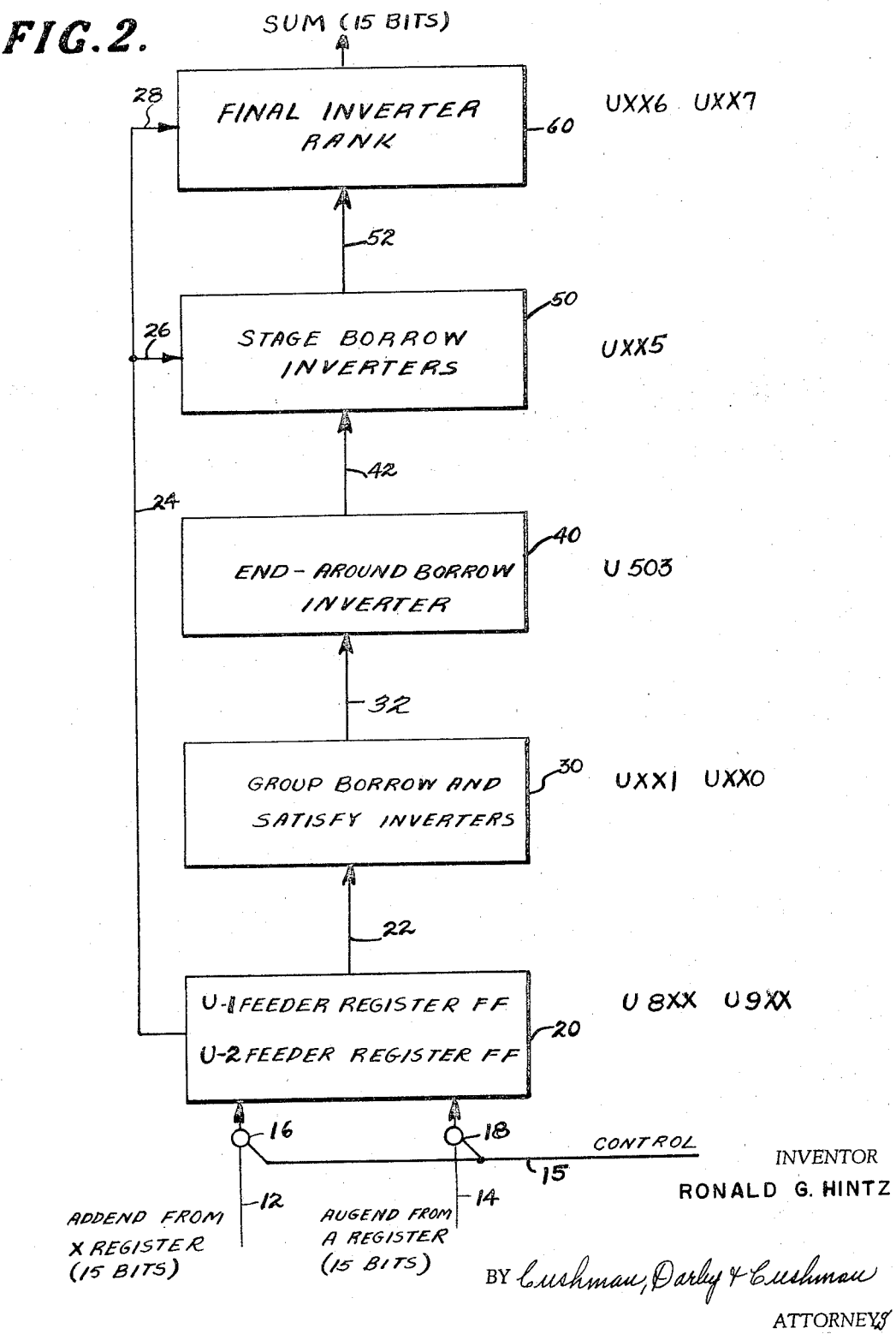

INVENTOR
RONALD G. HINTZ
BY Cushman Darby & Cushman
ATTORNEYS

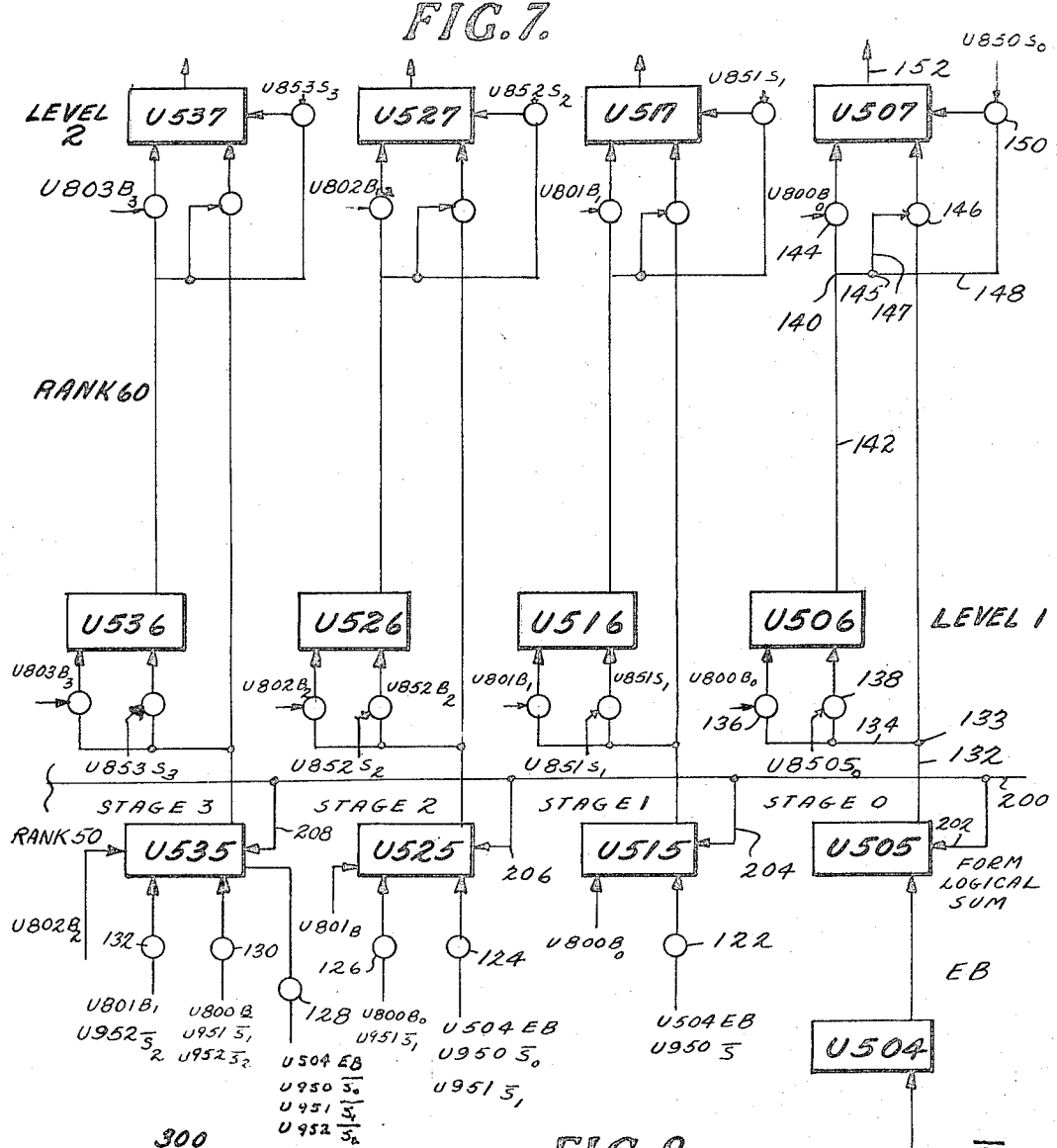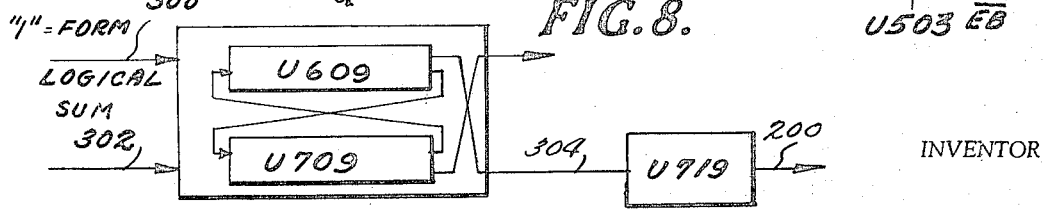

Dec. 20, 1966  R. G. HINTZ  3,293,422
BORROW PYRAMID HAVING SIMULTANEOUS BORROW
GENERATION AND NORMALIZE SYSTEM
Filed June 4, 1963  20 Sheets-Sheet 6
*FIG. 9.*
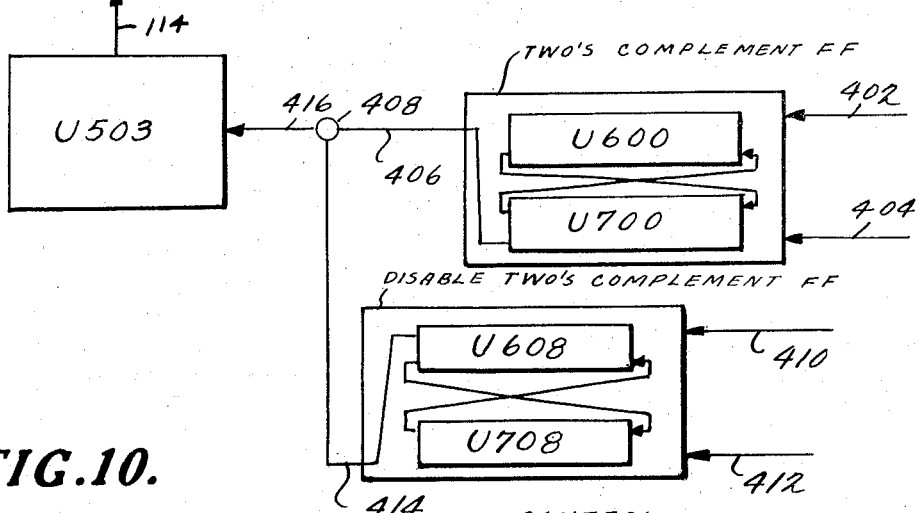
*FIG. 10.*
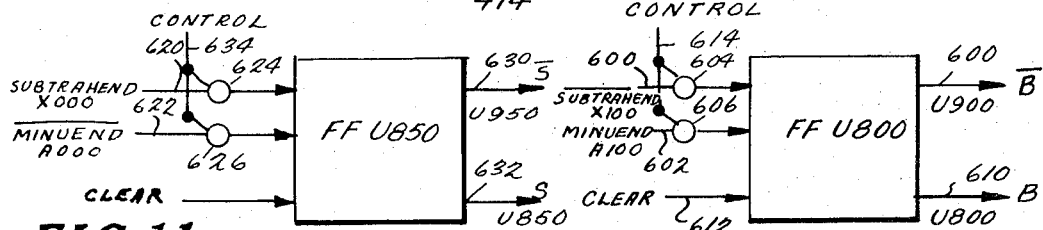
*FIG. 11.*
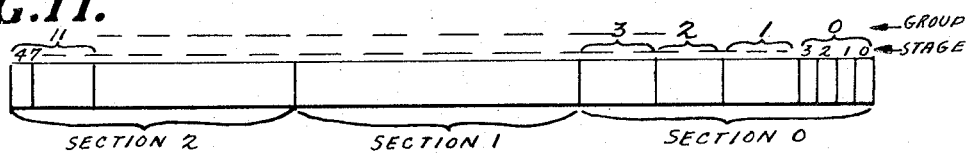
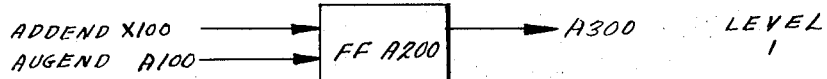
*FIG. 13h.*
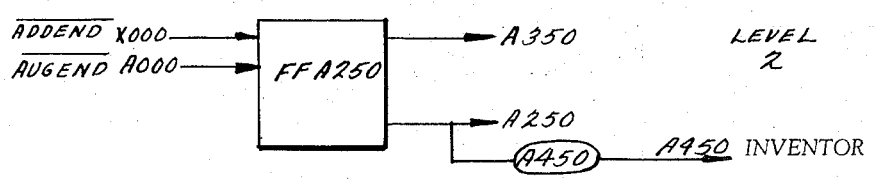
INVENTOR
RONALD G. HINTZ
BY Cushman, Darby & Cushman
ATTORNEYS

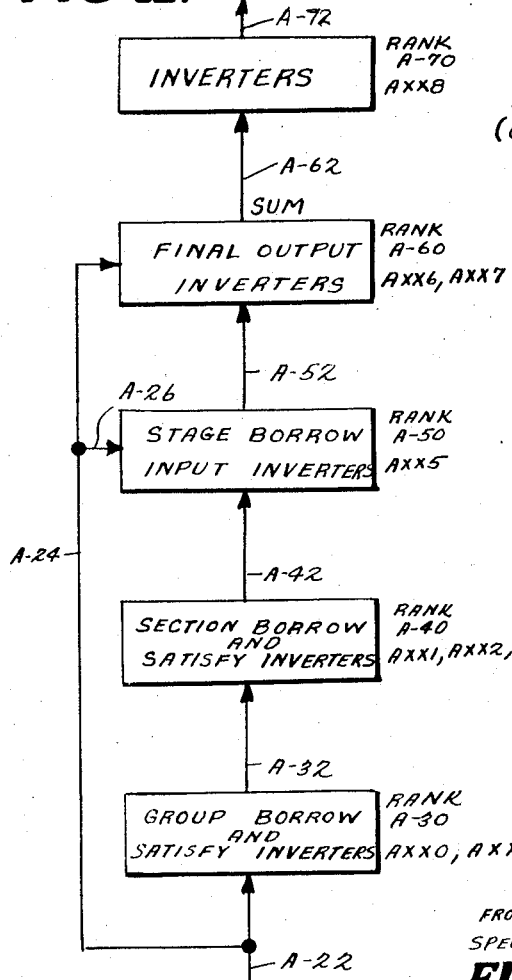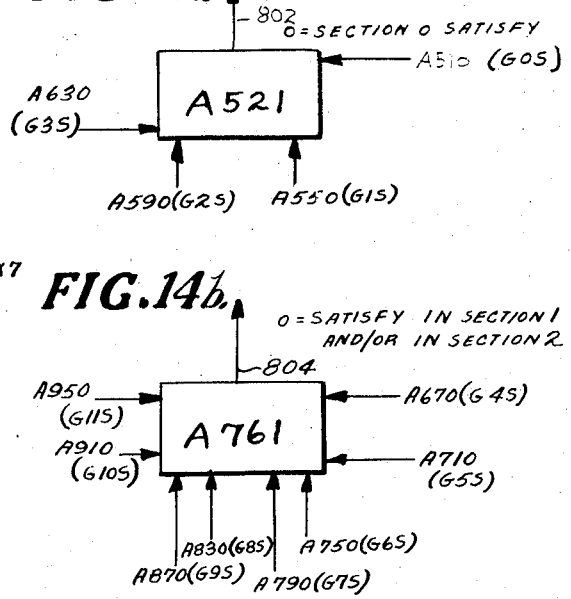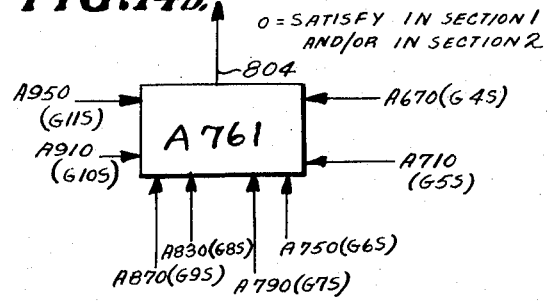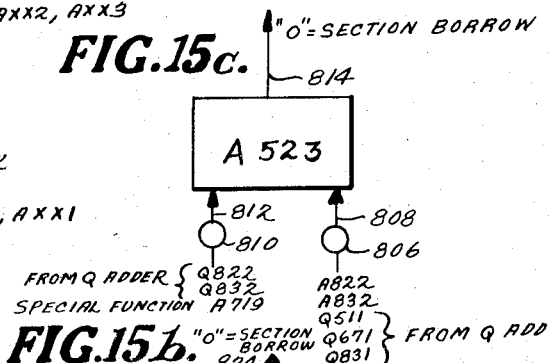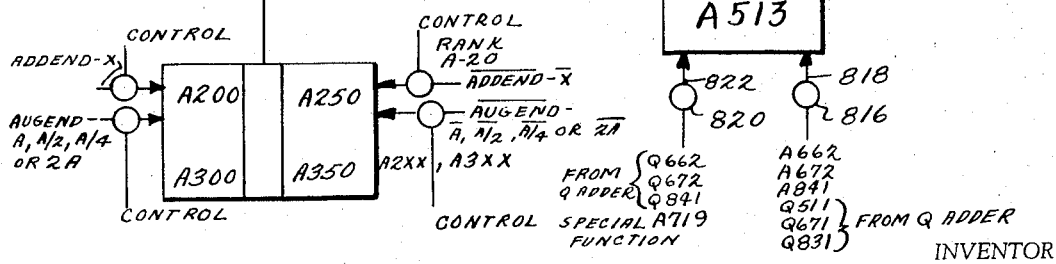

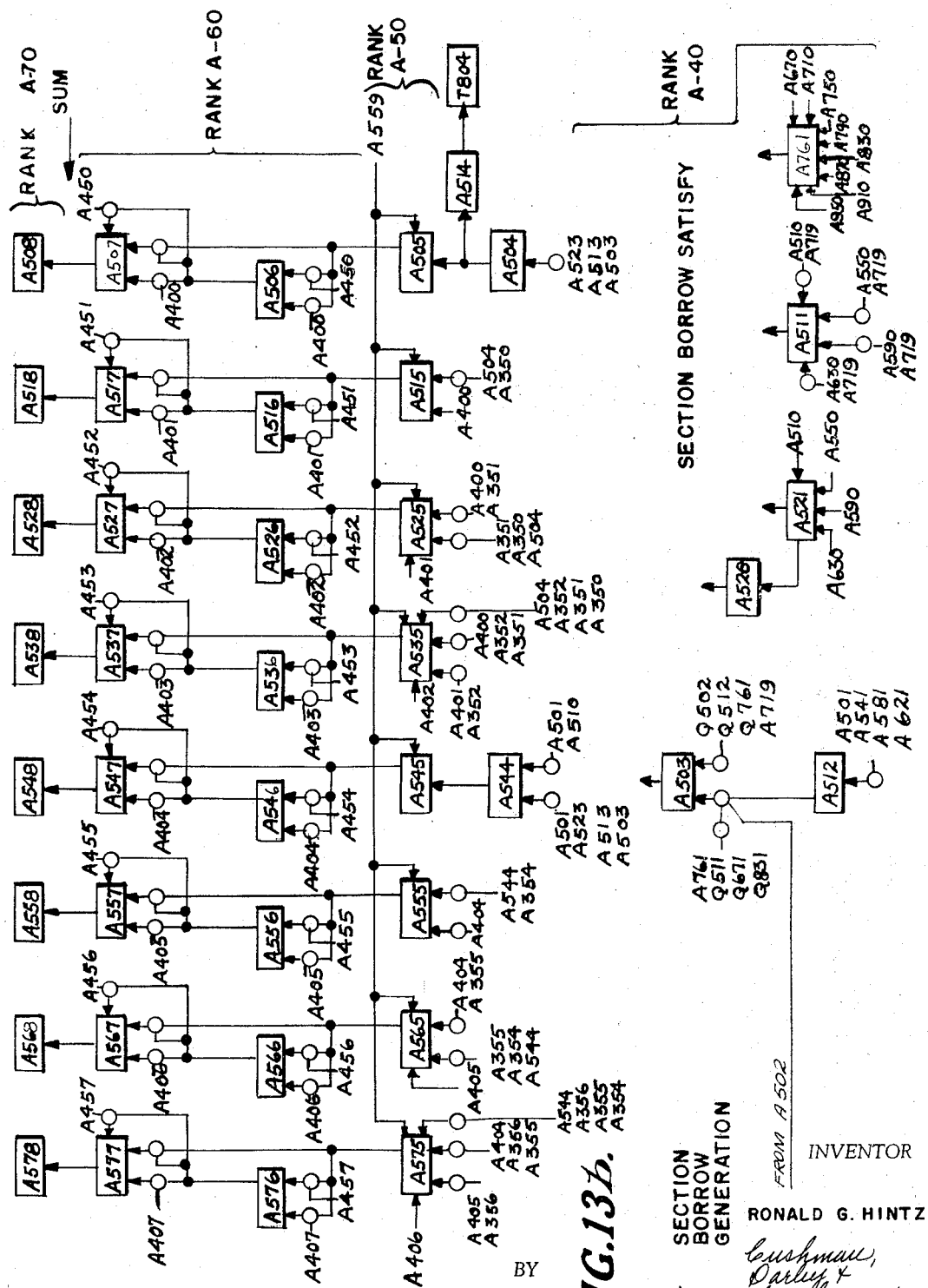

Dec. 20, 1966   R. G. HINTZ   3,293,422
BORROW PYRAMID HAVING SIMULTANEOUS BORROW
GENERATION AND NORMALIZE SYSTEM
Filed June 4, 1963   20 Sheets-Sheet 10

INVENTOR
RONALD G. HINTZ

BY Cushman, Darby & Cushman
ATTORNEYS

INVENTOR
RONALD G. HINTZ

BY Cushman, Darby & Cushman
ATTORNEYS

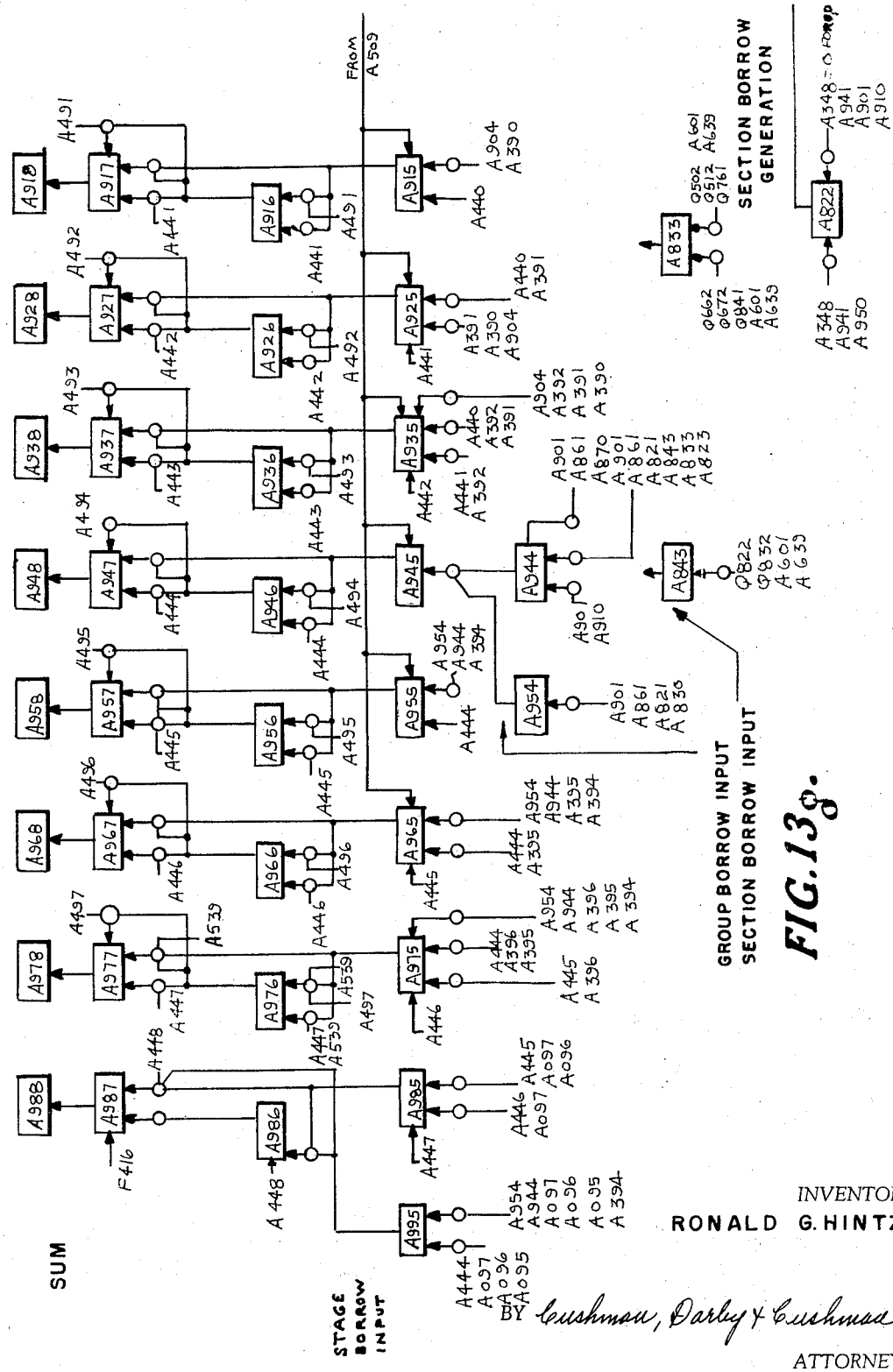

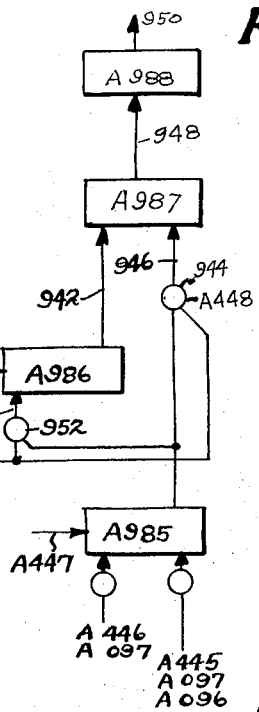
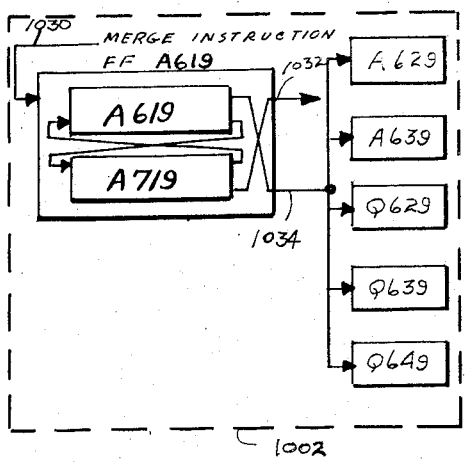
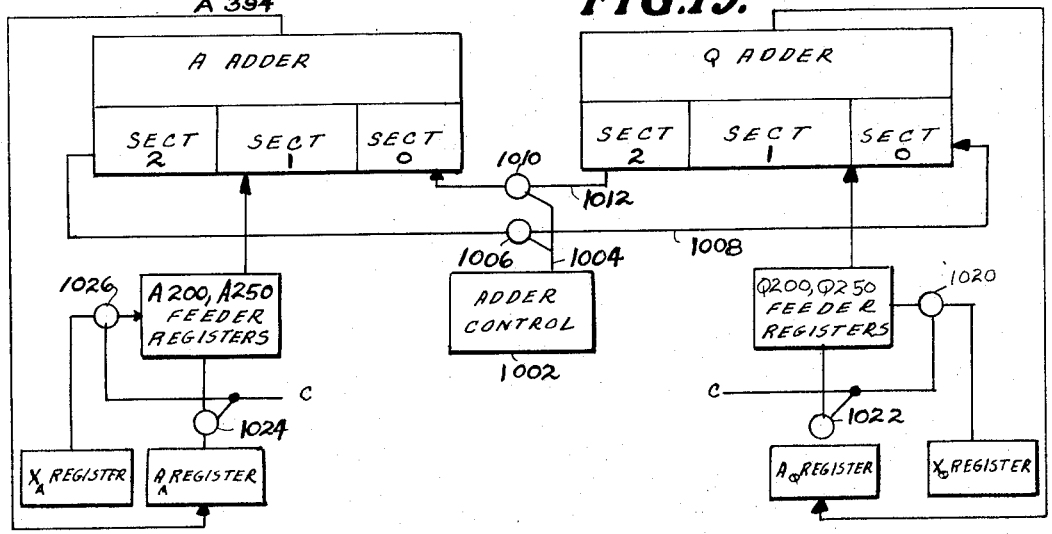
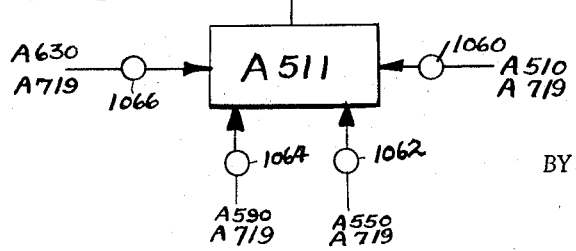

Dec. 20, 1966    R. G. HINTZ    3,293,422
BORROW PYRAMID HAVING SIMULTANEOUS BORROW
GENERATION AND NORMALIZE SYSTEM
Filed June 4, 1963    20 Sheets-Sheet 17
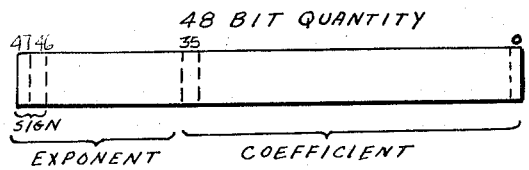
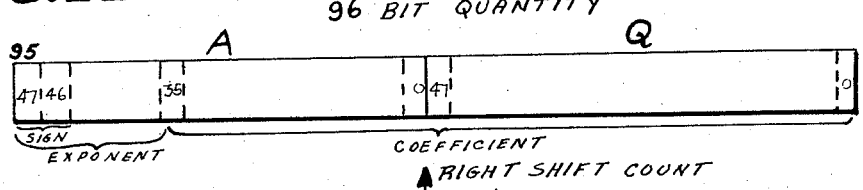
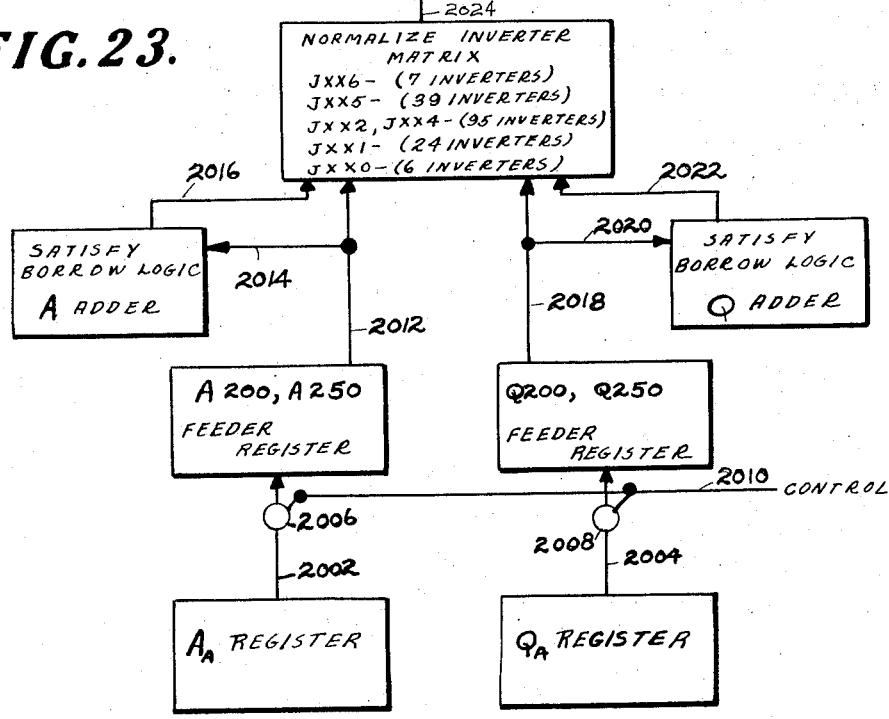
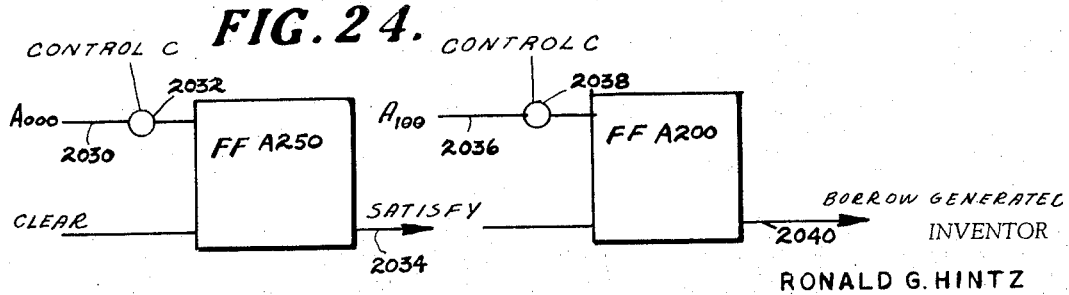
INVENTOR
RONALD G. HINTZ
BY Cushman, Darby & Cushman
ATTORNEYS United States Patent Office 3,293,422
Patented Dec. 20, 1966

3,293,422
BORROW PYRAMID HAVING SIMULTANEOUS
BORROW GENERATION AND NORMALIZE
SYSTEM
Ronald G. Hintz, St. Paul, Minn., assignor to Control
Data Corporation, Minneapolis, Minn., a corporation
of Minnesota
Filed June 4, 1963, Ser. No. 285,514
6 Claims. (Cl. 235—168)

This invention relates to an improved borrow pyramid having simultaneous borrow generation utilized in arithmetic units of high-speed digital computers and more particularly to a subtractive network capable of generating simultaneous borrows allowing an arithmetic unit such as a subtractive adder to operate at high speed and in the parallel mode.

Previous methods known in the art for successfully using a borrow pyramid in arithmetic units are known, but the methods used for sensing and determining the presence of a borrow and an enable or satisfy have been accomplished by the use of inverter networks. The inverters are usually gated in a predetermined logical configuration whereby the presence or absence of a borrow and enable or satisfy are determined at a group level. The data to be processed within this type of borrow pyramid must be prearranged in a predetermined format before transfer to the pyramid inputs. The final sum from this borrow pyramid is formed by forcing or toggling a separate accumulator, thereby generating the final sum separately from the pyramid. It is therefore an object of this invention to provide a means for determining the presence of a generated borrow and a generated satisfy at the stage or input level.

Another object of this invention is to provide a means for producing the final sum at the output of the borrow pyramid, which sum will be retained until the borrow pyramid is cleared eliminating the necessity of toggling the final accumulator.

Yet another object of this invention is to provide a borrow pyramid having input means capable of being utilized as a portion of a logical network wherein logical operations may be performed in transferring data into the borrow pyramid.

A further object of this invention is to provide a means for coupling two individual borrow pyramids to form a single larger borrow pyramid providing a means of processing data twice the bit length of an individual borrow pyramid.

An additional object is to provide an improved normalization device for use in devices operating in the floating point decimal system.

A still further object of this invention is to provide means for utilizing the input portion of the borrow pyramid as a completely independent part, which part thereby becomes an integral portion of a separate logical configuration.

Further objects and the entire scope of the invention will become more fully apparent when considered in light of the following detailed description of illustrative embodiments of this invention and from the appended claims.

The illustrative embodiments may best be understood by reference to the accompanying drawings wherein:

FIGURE 1a is a block diagram illustrating a typical register arrangement for the groupings of the quantities associated with the borrow pyramid of the invention;

FIGURE 1b is a block diagram which illustrates a typical register flip-flop of which the registers of FIGURE 1a are comprised;

FIGURE 2 is a block diagram indicating the function of the various ranks of a 15 bit U borrow pyramid;

FIGURE 4 is a block diagram illustrating a typical stage flip-flop which comprises the input means of the borrow pyramid shown in FIGURE 3;

FIGURE 7 is a logic diagram of the final output inverters for generating the final sum as shown in FIGURE 3;

FIGURE 8 illustrates in a block diagram a "form the logical sum" control flip-flop of the 15 bit U borrow pyramid;

FIGURE 9 is a logic diagram of a "operate in the two's complement mode" flip-flop control;

FIGURE 10 is a logic diagram of the input into a typical input flip-flop for an arithmetic subtraction;

FIGURE 11 is an illustration of the format of a 48 bit quantity to be processed by a 48 bit borrow pyramid;

FIGURE 12 illustrates in block diagram the function of the various ranks of a 48 bit borrow pyramid;

Figure 13A:
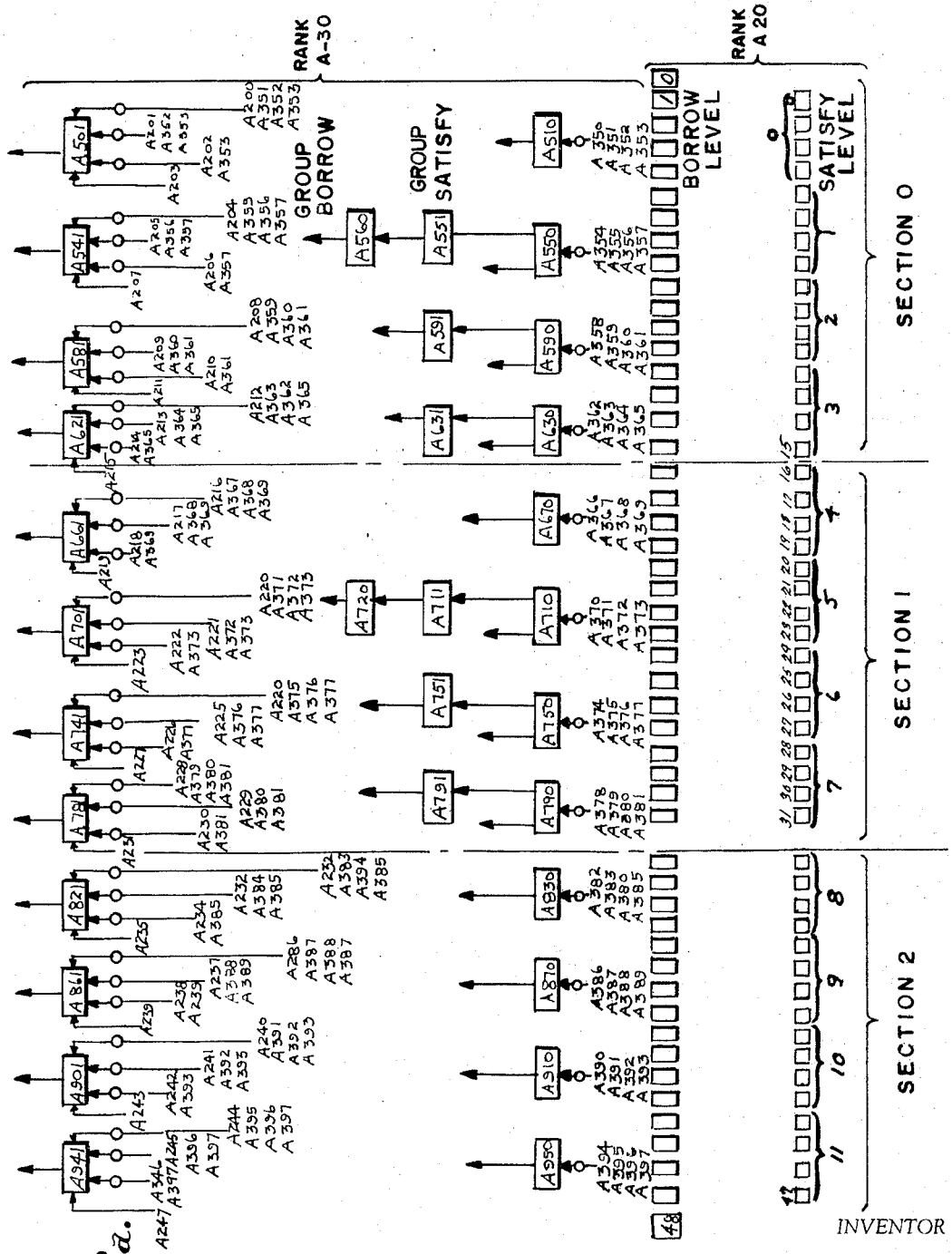
Figure 13C:
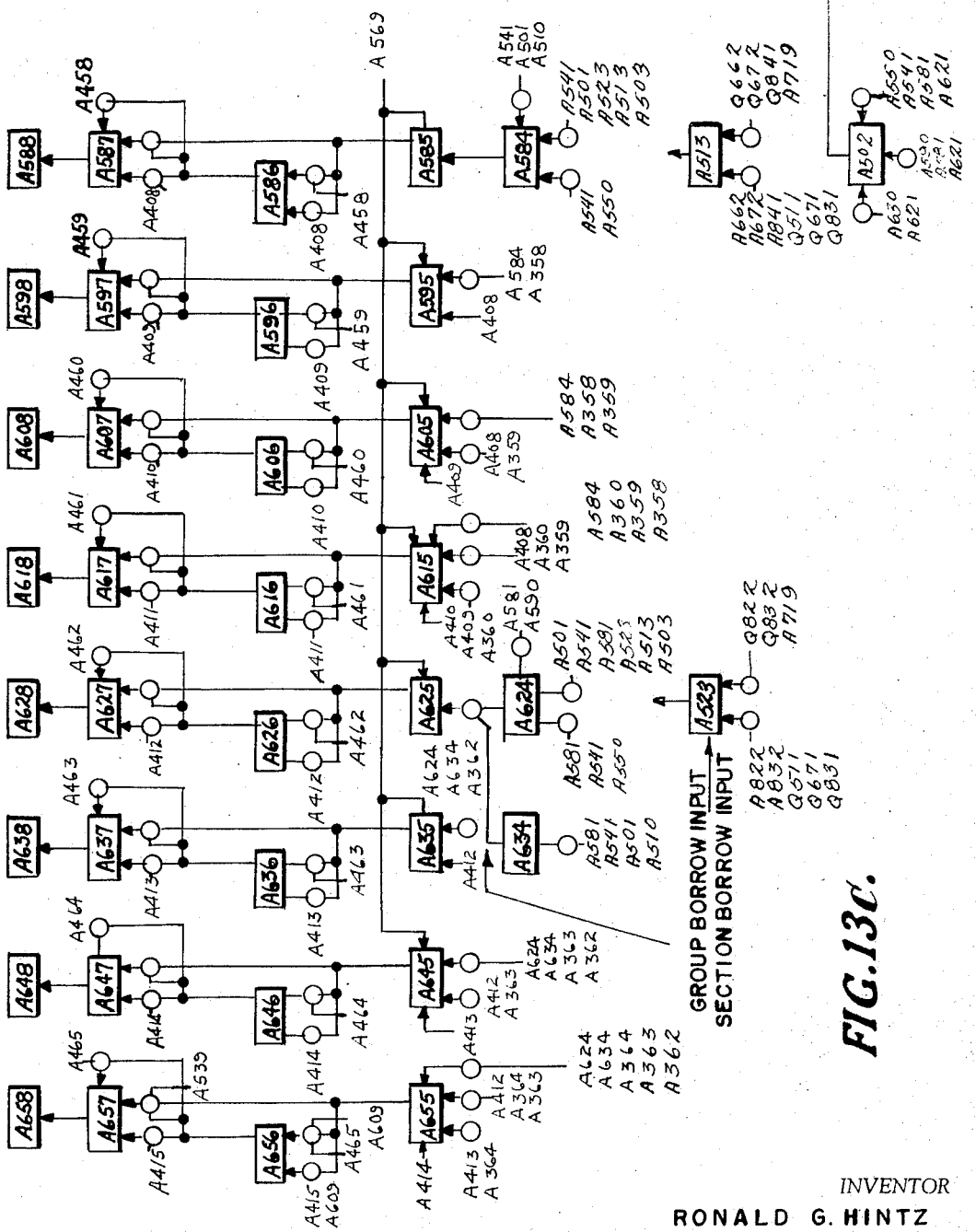
Figure 13D:
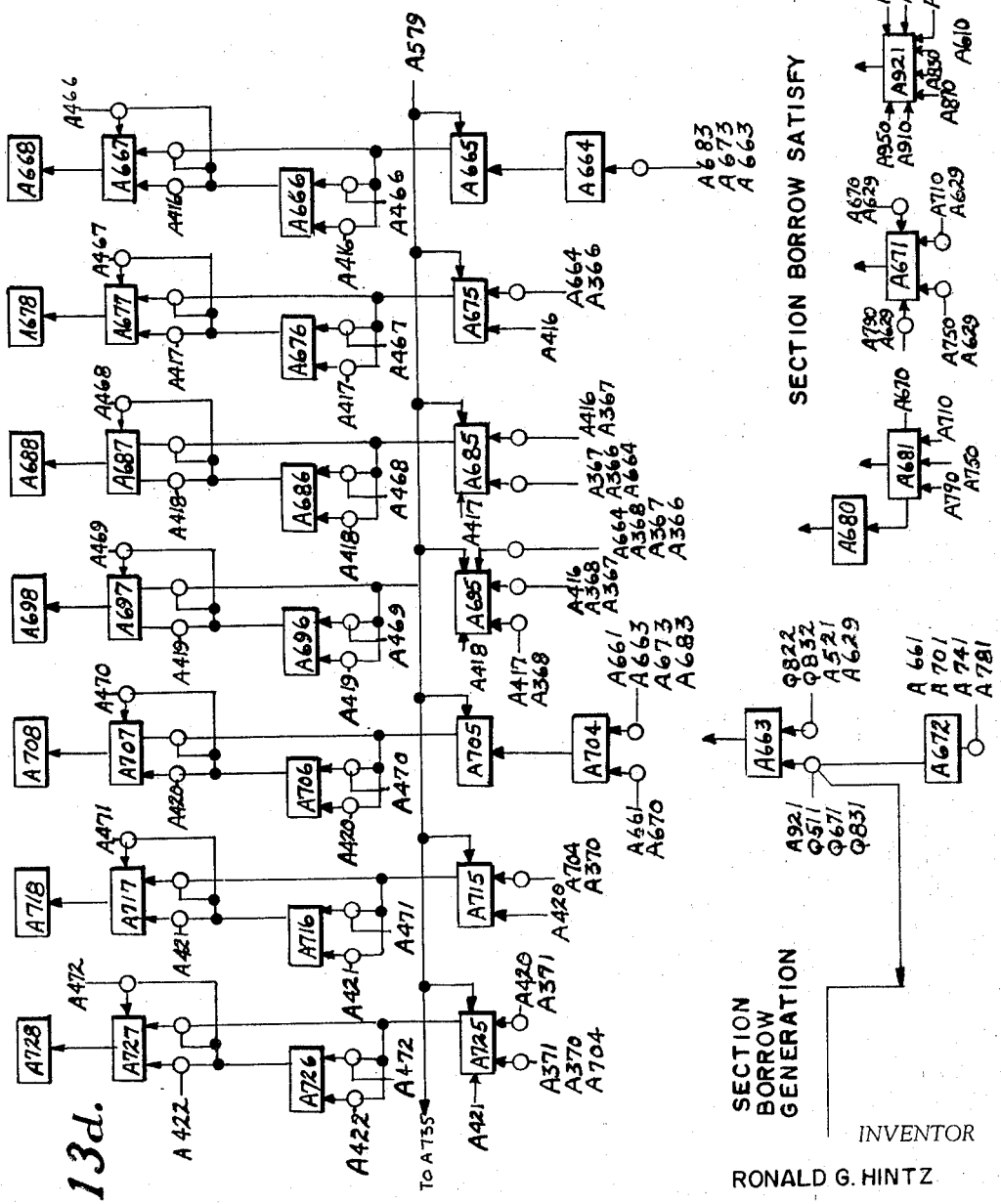
Figure 15A:
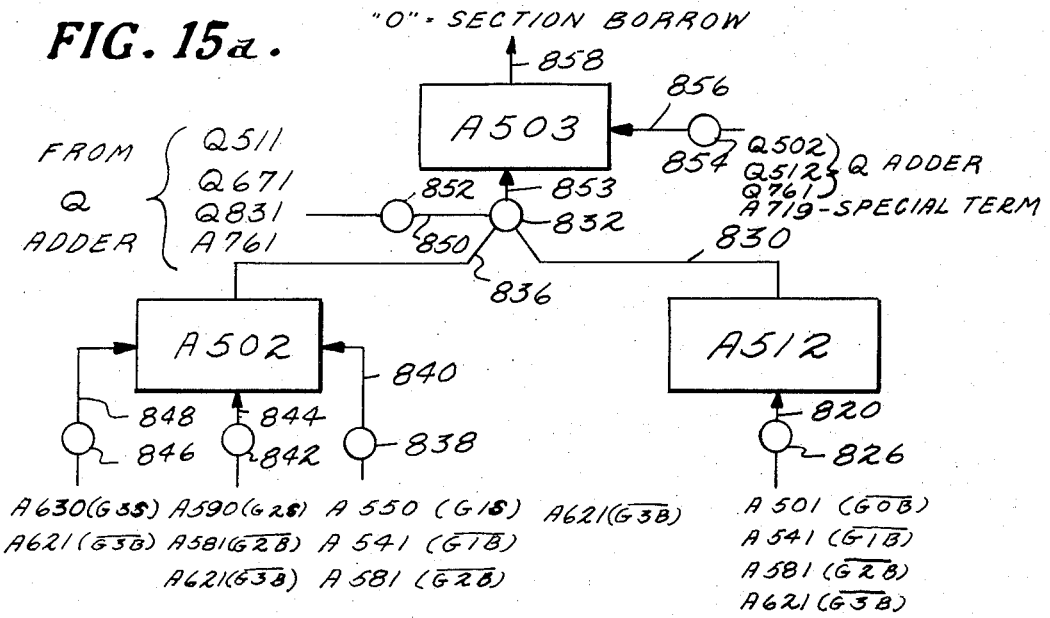
Figure 16:
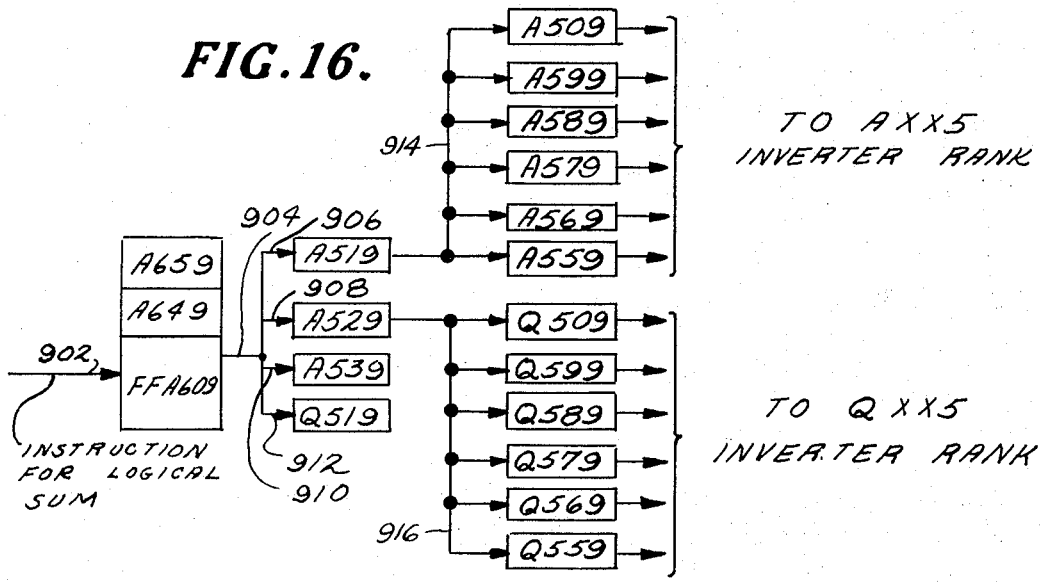
Figure 17:
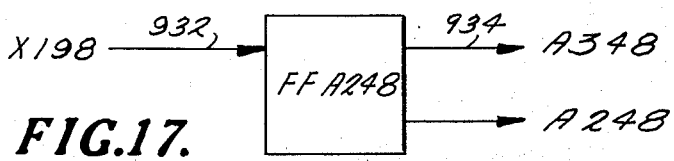
Figure 25A:
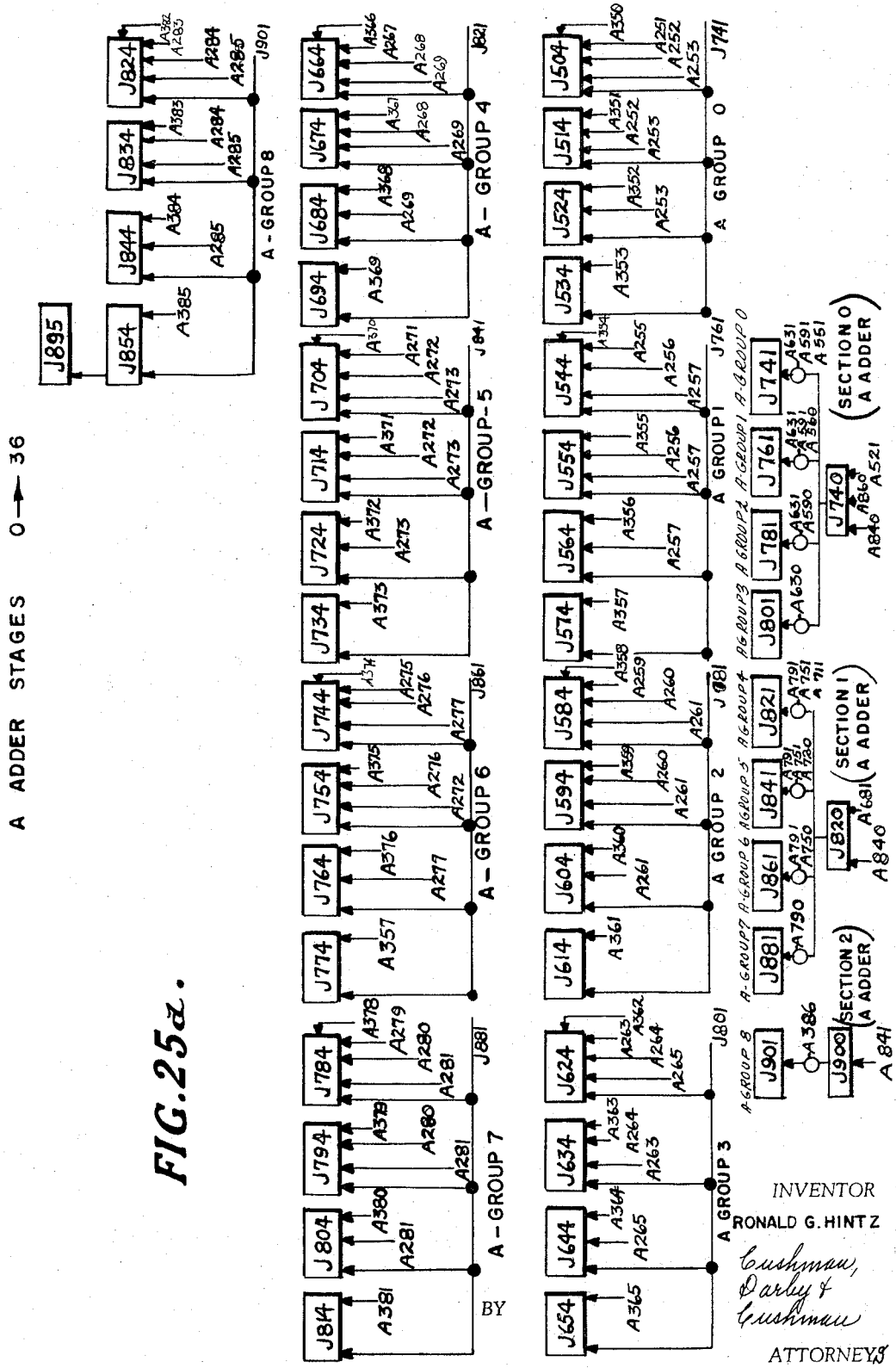
Figure 25B:
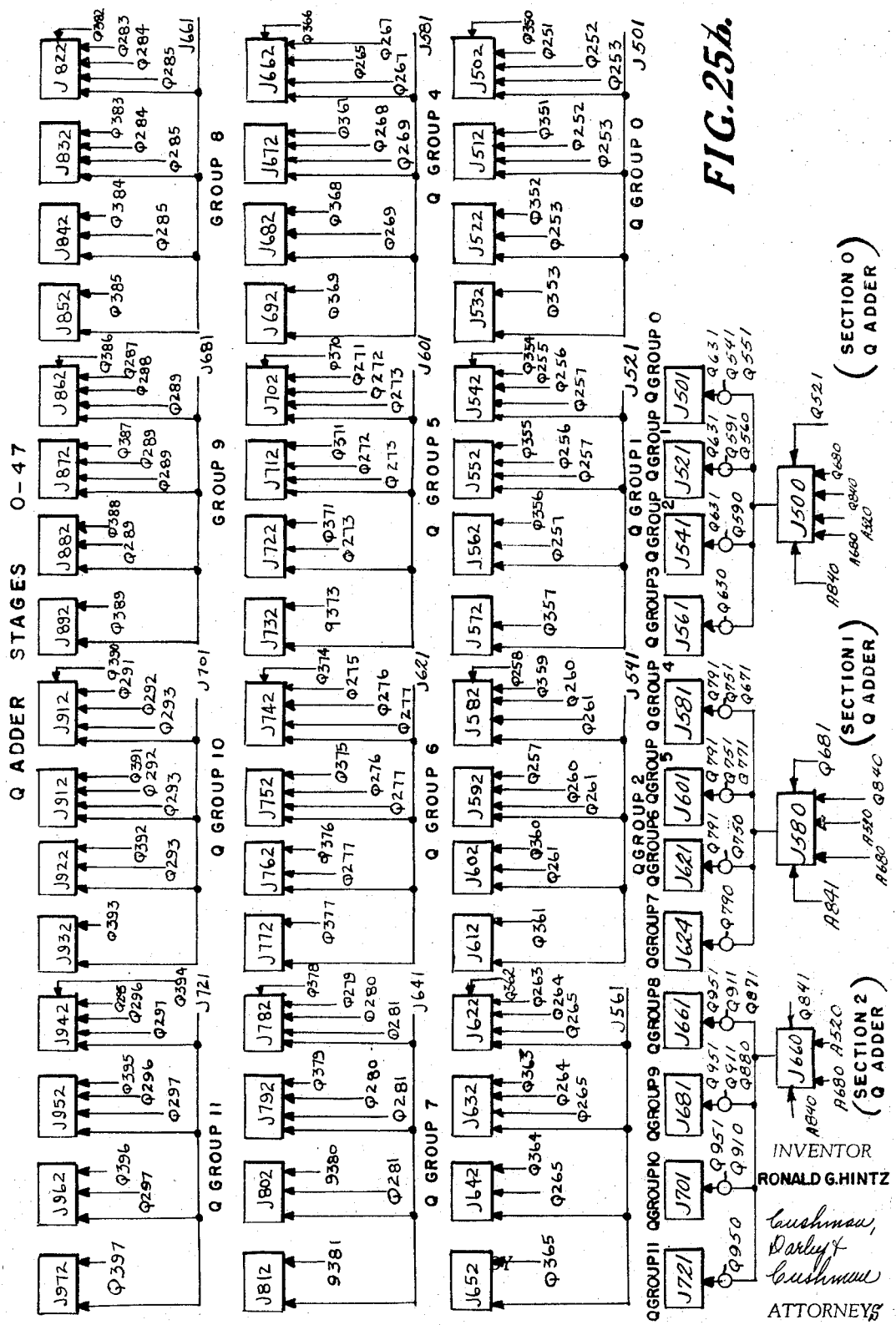
Figure 25C:
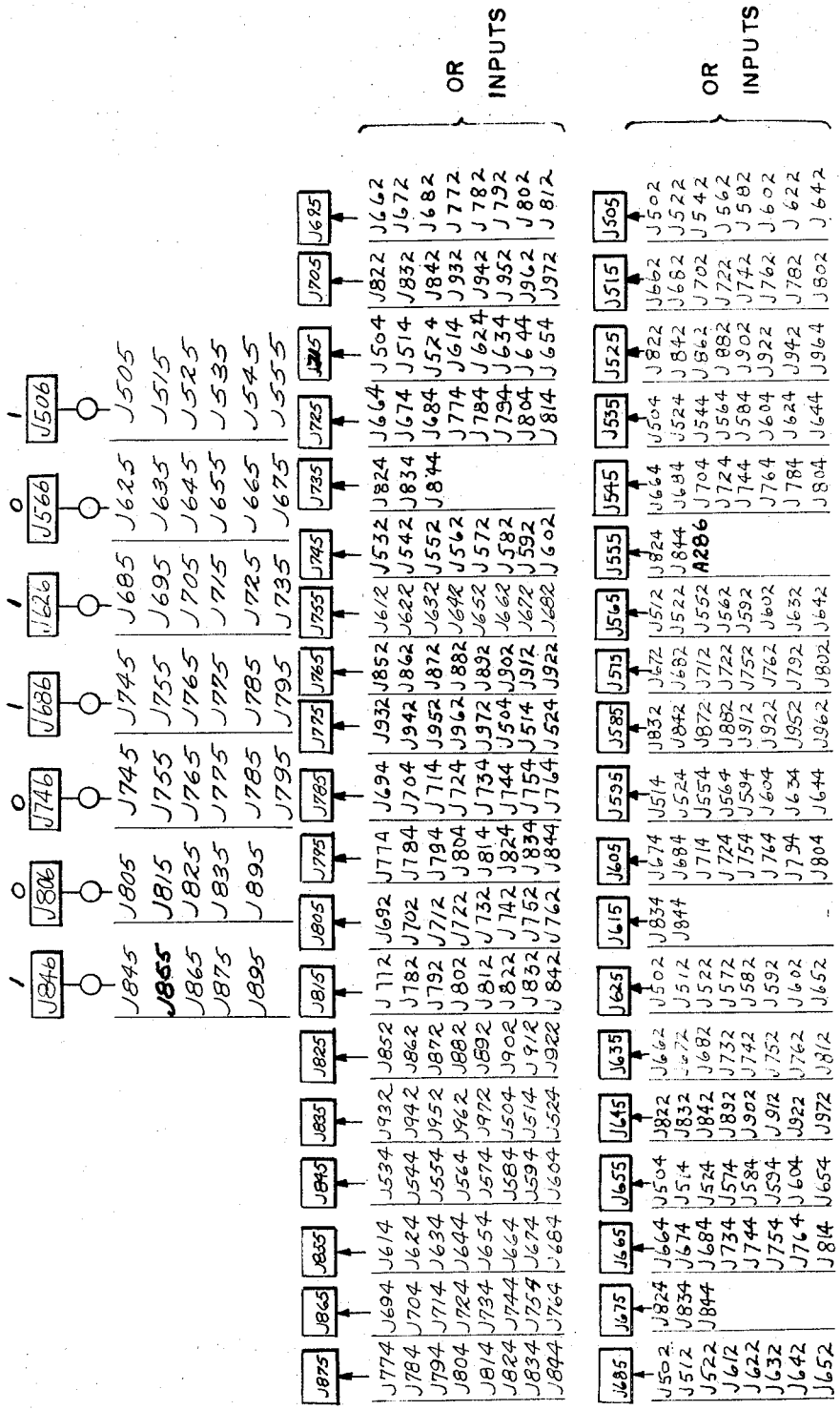

FIGURES 13a–g are portions of a logic diagram which when integrated illustrate the principal elements of the 48 bit borrow pyramid, referred to as an A adder, illustrating the various flip-flops and inverters associated with each rank as shown in FIGURE 12;

FIGURE 13h is a block diagram of the flip-flop which comprises the input means of the borrow pyramid as shown in FIGURE 13a;

FIGURE 14a is a logic diagram of a typical section satisfy inverter as shown in FIGURE 13b;

FIGURE 14b is a logic diagram of an additional section satisfy inverter as shown in FIGURE 13b;

FIGURE 15a is a logic diagram of one section borrow inverter array as shown in FIGURES 13b and c;

FIGURE 15b is a logic diagram of another section borrow inverter as shown in FIGURE 13c;

FIGURE 15c is a logic diagram of a third section borrower inverter as shown in FIGURE 13c;

FIGURE 16 is a logic diagram of a control configuration to "form the logical sum" within the 48 bit borrow pyramid;

FIGURE 17 illustrates in a block diagram a 49th stage flip-flop which is coupled to the borrow pyramid input means to enable the 48 bit pyramid to perform special operations;

FIGURE 18 is a logic diagram of the 49th stage output inverters coupled to the borrow pyramid final output means to enable the 48 bit pyramid to perform special operation using 49 bit quantities;

FIGURE 19 is a logic diagram illustrating the logical configuration for combining two independent adders to form a larger adder;

FIGURE 20 is the logic diagram of the control which couples the individual adders as shown in FIGURE 19;

FIGURE 21 is a logic diagram of the inverter located within each adder as shown in FIGURES 13a–g;

FIGURE 22a is an illustration of a 48 bit quantity expressed in floating point format;

FIGURE 22b is an illustration of a 96 bit quantity expressed in floating point format;

FIGURE 23 is a logic diagram illustrating the logical configuration wherein the input means of an adder are utilized as an integral portion of a normalize network for normalizing in the floating point arithmetic system;

FIGURE 24 is a block diagram of a typical stage flip-flop of the adder when used as a portion of the normalize network of FIGURE 23; and FIGURES 25a–c are portions of a logic diagram which when combined constitute the principal elements of the normalize matrix which produces a right shift count output.

The borrow pyramid having simultaneous borrow generation is a subtractive adder wherein the operands and their complements are applied to the borrow pyramid input means. Thereafter the borrow pyramid simulates the addition by complementing the addend and subtracting it from the augend. The input means subsequently generate a stage borrow or satisfy if either are present. The generated borrows and satisfies are then passed through the various ranks of the borrow pyramid. As they pass through the borrow pyramid, each rank provides checking means for determining the presence of these borrows and satisfies. If a borrow is generated, the pyramid, via the checking means then determines where the generated borrow can be satisfied. The final sum is obtained when the outputs from the borrow pyramid input means are merged with results of the checking means at the final output level.

Before describing the operation of the preferred embodiment of the invention, the general philosophy of the arithmetic operation will be discussed.

In any number system, the addition of two numbers may be accomplished by complementing the addend and then subtracting it from the augend. The complementary system of arithmetic is discussed on pages 119–135 of "Arithmetic Operations in Digital Computers," by R. K. Richards.

In this arithmetic system, two types of complements are used, the complement which corresponds to the number base of the system being used, and the complement which corresponds to one less than the number base of the system.

The general equation for addition by subtraction of the complement of the addend from the augend wherein the complement corresponding to the number base of the system is:

(1) $\quad N_1 - [R^n - N_2] + R^n = \text{sum}$ wherein:

$N_1$ is the augend
$N_2$ is the addend
$R$ is the complement base
$n$ is the number of orders in use This equation may be modified to prove the addition by subtraction of the complement of the addend from the augend where the complement corresponds to one less than the base system as follows:

(2) $\quad N_1 - [(R^n - 1) - N_2] + R^n - 1 = \text{sum}$

The values of the equation correspond to those set forth in Equation 1.

In this invention the binary number system results in the use of 1's complement or 2's complement arithmetic. The addition by the subtracting of the complement of the addend from the augend method may best be shown by means of examples where the number base used is 10, and then a subsequent example where the number base is 2.

First, if the sum of two numbers is to be found using the base 10, the 10's complement of the addend is obtained and subtracted from the augend. Assume:

The augend $= 36_{10}$
The addend $= 14_{10}$ and substituting the values into Equation 1, $36 - (100 - 14) + 100 = \text{sum}$
(10's complement of 14)
$= 136 - 86 = 50$
(sum)
(10's complement)

Usually the abbreviated form shown is, $36_{10} + 14_{10} = \text{sum}$
$= B36 - 86 = 50$
(sum)
(10's complement)

Where in the augend represented by the B36 has the true value of 136. A borrow indicated by the B can be made from the higher stage giving the sum of 50.

The equivalent result may be obtained by using a complement of one less than the base number of the system. This second example provides for subtracting the 9's complement of the addend from the augend:

Assume:

The augend $= 36_{10}$
The addend $= 14_{10}$ and substituting the values into Equation 2

$36 - (99 - 14) + 99 = \text{sum}$
(9's complement of 14)
$= 135 - 85 = 50$
(sum)
(9's complement)

usually the abbreviated form shown is:

$36_{10} + 14_{10} = \text{sum}$
$= 36 - 85 = 51$
(partial sum)
(9's complement)
$51 - 1 = 50$
(partial sum) (end around borrow) $=$ (sum)

Here the true value of the augend is $36 + 99 = 135$. When proceeding in 9's complement arithmetic, the equivalent result is obtained by treating the augend as 136 and reducing the result by one which is accomplished by the subtraction of the end-around borrow.

In comparing the above examples with the binary arithmetic system, the 10's complement corresponds to the 2's complement, and the 9's complement corresponds to the 1's complement. Thus, when adding two binary quantities, identical results may be obtained using 1's complement or 2's complement.

To illustrate the addition of binary numbers using the subtraction of the 2's complement of the addend from the augend consider the following example:

Assume:

The augend $= 50_8 = 101000_2$
The addend $= +16_8 = +001110_2$ and substituting the values in Equation 1

$101000 - (1000000 - 001110) + 1000000 = \text{Sum}$
(2's complement)

$= {}^B 101000$
$\underline{-110010}$ (2's complement)
$110110_2 = 66_8$

Here a borrow must be made from the stage to the left of the highest stage. (In all discussions, the highest stage is the leftmost stage.) This borrow can be satisfied since the true value of the augend is 1101000.

Similarly, the same results may be obtained using 1's complement arithmetic:

Assume:

The augend $= 50_8 = 101000_2$
The addend $= 16_8 = +001110_2$ and substituting into Equation 2

$101000 - [(111111 - 001110) - 1] + 111111 = \text{Sum}$
(1's complement)

$= \phantom{-}101000$
$\underline{-110001}$ (1's complement)
$\phantom{-}110111$
$\phantom{-}\underline{-1}$ [end-around borrow]
$\phantom{-}110110_2 = 66_8$ Here the true value of the augend is $$101000 + 111111 = 1000111$$

When proceeding in the 1's complement arithmetic, the equivalent result is obtained by treating the augend the same as in the 2's complements made and reducing the final result by one, which is accomplished by the subtraction of the end-around borrow.

The disclosure of the operation of the invention in a preferred embodiment will be made in two sections. The first section will be directed towards a U pyramid which is an inverter network capable of forming the sum, difference, or logical sum of two 15 bit numbers (wherein a bit is a binary digit represented by a "1" or a "0") where X is the addend and A is the augend.

The second section will be directed towards an A adder which is an inverter network capable of forming the sum of $X+A$, $X+A/2$, $X+A/4$ and $X+2A$. In this section the X is the addend and A, or a function thereof, is the augend; each operand being a 48 bit number.

Referring now to the U pyramid of section one. The U pyramid as hereinbefore stated is a network wherein arithmetic operations are performed in parallel requiring minimum computation time. The addend X is contained within the X register and the augend A is contained within the A register. The registers are divided into four groups as shown in FIGURE 1a. Each group comprises of four stages, with the exception of the leftmost group which comprises of three stages. Each bit of the number is identified as a stage within the register and is numbered from 0 to 14. The register means for retaining the information may be any register means well known in the art and may be a flip-flop storage means as disclosed in a copending patent application Serial No. 285,493 of Leo F. Slattery et al. entitled, "Bi-Level Inverter Circuit," filed concurrently herewith. FIGURE 1b illustrates a typical register flip-flop of which registers of FIGURE 1a are comprised. This flip-flop is formed using a pair of cross-coupled inverters.

The U pyramid performs addition by using "1's" or "2's" complement methods. The pyramid never actually complements the addend, but it makes all decisions by looking at the addend as if it were complemented.

Consider now binary addition in the "1's" complement, there are four possible cases which must be considered. These are:

```
(1)  0    (2)  0    (3)  1    (4)  1
    +0        +1        +0        +1
```

When the pyramid is to perform the addition, effectively the addend is complemented and subtracted from the augend producing the following cases:

```
(1)  0    (2)  0    (3)  1    (4)  1
    -1        -0        -1        -0
    ──        ──        ──        ──
    B         E         E         S
```

In case 1, the pyramid looks at the true values "0" and "0." When the addend is complemented, it thereby becomes a "1." Since a "1" cannot be subtracted from "0," a borrow must be made from some higher stage, which condition is indicated by a B. Thus, borrows are generated in all stages corresponding to case 1.

In cases 2 and 3, when the addend is complemented, the subtraction can be performed. If another stage attempts to borrow from the augend of cases 2 and 3, the borrow cannot be made but must be passed on or enabled to another stage. This condition is identified by an E in the cases. Thus, stages which contain numbers as in cases 2 and 3 generate enables.

In case 4, when the addend is complemented, the subtraction can be made. Further, another stage may borrow from this stage to satisfy a borrow whereby the subtraction can still be performed. This condition is identified by an S in case 4. Therefore, stages which contain numbers such as in case 4 generate a satisfy since they will satisfy a borrow from another stage.

The operation of the U pyramid is depended upon passing the 15 bit numbers from the X and A registers to the borrow pyramid feeder registers U–1 and U–2. FIGURE 2 shows the borrow pyramid ranks through which the numbers are to pass, thereby effectively being subtracted, terminating at the final rank wherein the sum is retained. The primary function of the borrow pyramid is to eventually check each individual stage and determine if that stage is acted upon by a borrow from a lower stage, and if so, to condition that stage to produce the correct difference between the two numbers. Referring to FIGURE 2, the input to the borrow pyramid is made by applying the addend to line 12 and the augend to line 14. The control line 15 conditions AND gates 16 and 18 to pass the addend and augend ino the sampling feeder registers U–1 and U–2 shown as rank 20. The inverters in rank 20 which comprise the feeder registers are identified by the numbering scheme of U8XX and U9XX. The output 22 of rank 20 comprises the outputs of U–1 and U–2 of the feeder register flip-flops (designated hereinafter as FF) wherein the individual borrows, satisfies and enables are acknowledged. The output of rank 20 also is an input to rank 50 and rank 60 via line 24 and inputs 26 and 28, respectively. Rank 30 receives the output 22 from rank 20. Rank 30 is a higher lever sampling rank wherein the individual stage conditions are grouped, similar to the groupings of FIGURE 1a. A group borrow is generated if an individual stage within a group has a borrow generated and that borrow cannot be satisfied from within the group. Rank 30 also samples if a group is able to satisfy a group borrow from a lower group. The output of rank 30 includes whether a group borrow or group satisfy is generated; and if so, conditions rank 40. The rank 30 inverters which acknowledge the presence of group borrows are identified by UXX1 and the inverters associated with the group satisfies are identified by UXX0. Rank 40 performs a single function, that being to generate an end-around borrow if the last group either generates a borrow or if the last group cannot satisfy a borrow generated in a lower group. The end-around borrow output 42 from rank 40 conditions the first stage of the first group of rank 50 to either satisfy the end-around borrow or to enable the borrow to pass to a successive or higher group. The end-around borrow inverter is identified as U503. Rank 50 receives a second input 26 from rank 20 via line 24 which is merged with the input 42 from rank 40.

The function of rank 50 is to decide if an end-around borrow is satisfied at the first stage or whether that borrow must be passed to a higher stage to be satisfied. A second function is to acknowledge that a borrow generated in any lower stage has not been satisfied and must be passed to a higher stage. The output 52 of rank 50 is passed to rank 60, the final inverter rank. The inverters of rank 50 are identified as UXX5. Rank 60 also receives a second input 28 from rank 20 via line 24. Rank 60 merges the inputs performing the borrowing and satisfying determined necessary by rank 50 upon the sampling numbers determined by the feeder registers U–1 and U–2 in rank 20. The final sum is retained in rank 60 and is transmitted via output 62 from the pyramid. Rank 60 includes the inverters identified as UXX6 and UXX7.

Figure 3:
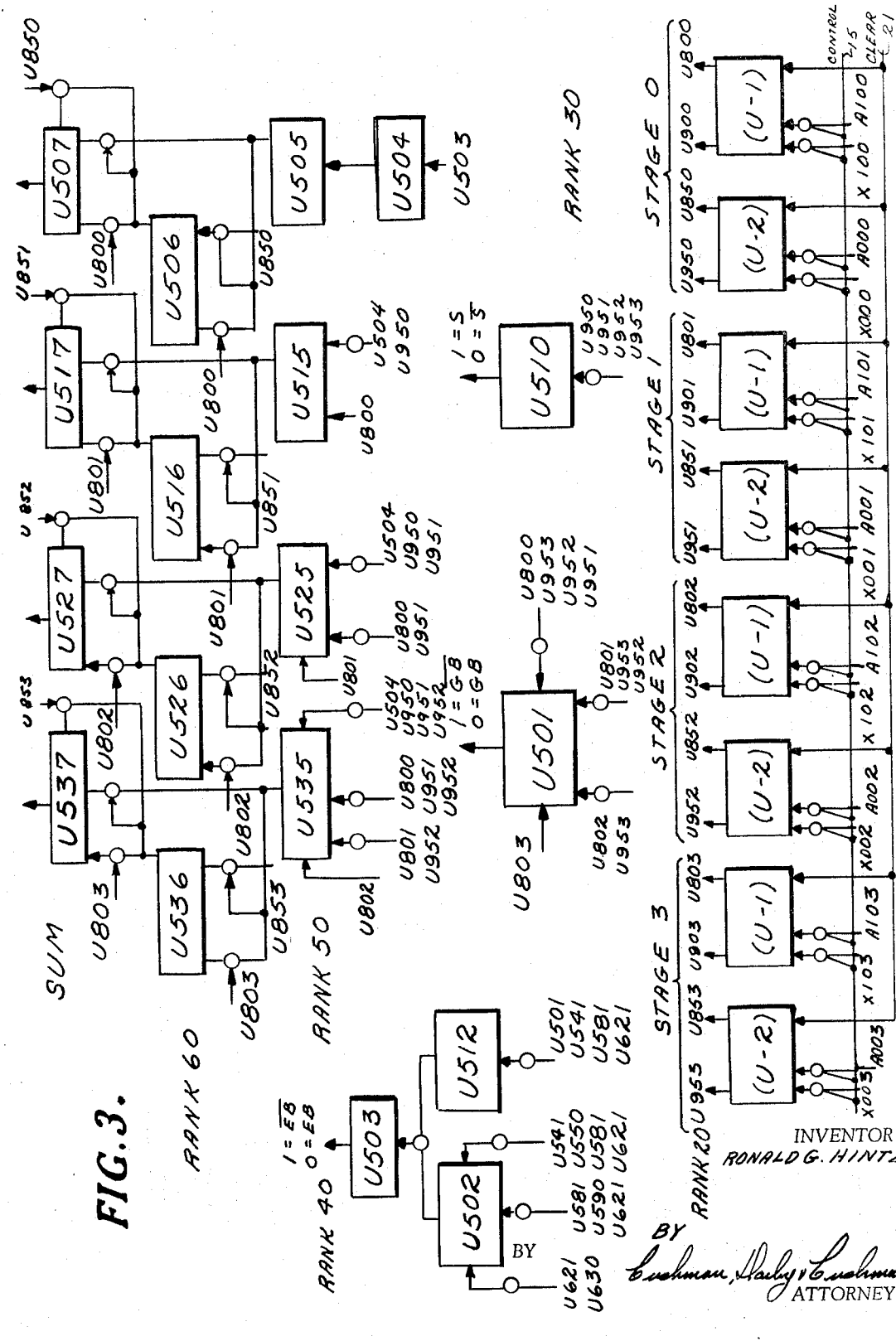
FIGURE 3 is a logic diagram of the principal elements of a 15 bit U borrow pyramid illustrating the flip-flop and inverters of each ranks as shown in FIGURE 2.

When two 15 bit numbers are to be added, the contents of registers X and A are transmitted to the rank 20 level of the pyramid as shown in FIGURE 3. Rank 20 comprises two feeder registers, identified as U–1 and U–2, each of which has a FF for each stage. The inverters are cross connected (see FIG. 4) to form a FF which has set input and clear input lines and set output and clear output lines. Referring to rank 20 of FIGURE 3 which illustrates the FF's and inverters associated with a group 0, operatively associated with group 0 of the X and A registers, each stage comprises a FF of each feeder register. For example, stage 0 comprises a FF of feeder register U–1 including inverters U800 and U900 and a FF of register U–2 including inverters U850 and U950. When reference is to be made to a FF in either feeder register hereinafter, the inverter in the U8XX series will be used. Each stage of the 15 bit quantity will similarly include identical FF's and be identified in accordance with the above scheme.

The output of rank 20, and more specifically the individual FF outputs thereof, condition the borrow and satisfy inverters of rank 30. The group 0 borrow inverter is U501 and the group 0 satisfy inverter is inverter U510. The inverters of rank 30 in group 1 would be numbered 40 to above those of group 0, for example U550, and further group 2 rank 30 inverters would be numbered 40 above group 1 (U590), and this identification system would be continued through group 3. The input to the various inverters are labeled corresponding to the inverter from which the input is received.

The end-around borrow inverter U503 of rank 40 receives inputs from the group borrow and satisfy inverters of group 0, 1, 2 and 3. The logical array for producing the end-around borrow will be explained in greater detail hereinafter.

Rank 50, the stage borrow inverters receive its input from rank 40 via inverter U504 which conditions the stage 0 stage borrow inverter U505 of rank 50. A second input is received from the feeder registers of rank 20 to all stage borrow inverters except stage 0 inverter U505. The stage 1 borrow inverter is identified as U515. Inverter U515 receives an input from U504 and U950 at a first OR input and an input U800 from the second OR input. The general identification scheme for identifying the inverters is to increase the last inverter by 10, for example stage 0 was U505, stage 1 was U515, stage 2 is U525 and so forth.

The final inverter rank 60 comprises of two levels of inverters. Referring to stage 0, the first level inverter U506 receives input from the stage 0 borrow inverter U505 of rank 50 and from the U–1 and U–2 feeder register FF of rank 20. Level two, inverter U507, receives input from level one inverter 506, stage borrow inverter U505 of rank 50 and U–1 and U–2 feeder registers of rank 20, specifically of FF U800 and U850. The output from level two of rank 60 contains the final sum and will continue to do so until the individual FF's of rank 20 are cleared.

Since the general theory and methods of operation have been discussed, each rank of the pyramid will now be considered in detail so as to explain how the borrow and satisfies are carried within the pyramid and how the final sum is produced. This discussion will be limited to group 0 and specifically stages 0 through 3 as illustrated in FIGURE 3. Stage 0 will be taken in cases where a typical stage operation is considered.

First referring to rank 20 and specifically to the feeder registers U–1 and U–2. FIGURE 4 illustrates an individual FF from each feeder register corresponding to stage 0. Now considering the feeder register U–1 FF for stage 0, the FF comprises inverters U800 and U900 which are interconnected to form a FF as hereinbefore stated. The set inputs to this FF U800 include the addend X100 from the X register applied upon line 12′ and augend A100 appled upon line 14′. The control line 15 conditions the AND gates 16′ and 18′ to condition the FF. The oututs of FF U800 appear at set output line 23 and clear output line 25.

Referring to feeder register U–2 FF for stage 0, the set inputs to FF U850 include the same inputs as applied to FF U800 with the exception that the inputs are complemented. The complemented augend is designed as $\overline{\text{addend}}$ X000 input applied upon line 12″ and the $\overline{\text{augend}}$ A000 input is applied upon line 14″. The control 15 conditions the AND gates 16″ and 18″ to condition the set input to FF U850. The outputs of FF U850 appear on the set output line 27 and the clear output line 29.

At the start of the add operation, the two feeder registers are both cleared by a "1" signal applied on the clear input line 21. The FF U800 feeder register receives the inputs X100 and A100, the true augend and addend from the X and A registers. If the incoming bits are "11," "10," or "01," the FF U800 will set. If the incoming bits are "00," the associated FF U800 remains cleared. As set forth in case I hereinbefore, if the augend and addend are "00," this condition generates a borrow, which is acknowledged by the FF U800 remaining cleared. Thus clear output 25 is a "1" thereby indicating a borrow is generated, which condition is noted as B. Conversely, the set output line 23 will be a "0" also indicating that a borrow is generated. This is indicated by $\overline{B}$.

The U–2 feeder register receives the inputs X000 and A000 which are the complements of the addend and augend respectively, from the X and A registers. If the addend and augend bits are not "11," the associated FF the U850 will set. If these two bits are "11," the associated FF U850 register remains cleared. Referring to case 4 when the augend and the addend are "11" and the addend is complemented, a satisfy condition exists. This condition is acknowledged by FF 850 remaining clear producing a "1" at the clear output line 29, which condition is noted by S. Conversely, the set output line 27 will be a "0" also indicating that a satisfy is generated, which condition is shown by a $\overline{S}$.

The purpose of the U–1 and the U–2 feeder registers are to sample the quantities to be added, then logically decide, upon the basis of complementing the addend and subtracting it from the augend, whether a stage borrow, enable or satisfy is generated.

The results of the sampling by the feeder register FF's are retained for propagation through the inverter ranks of the borrow pyramid.

Figure 5:
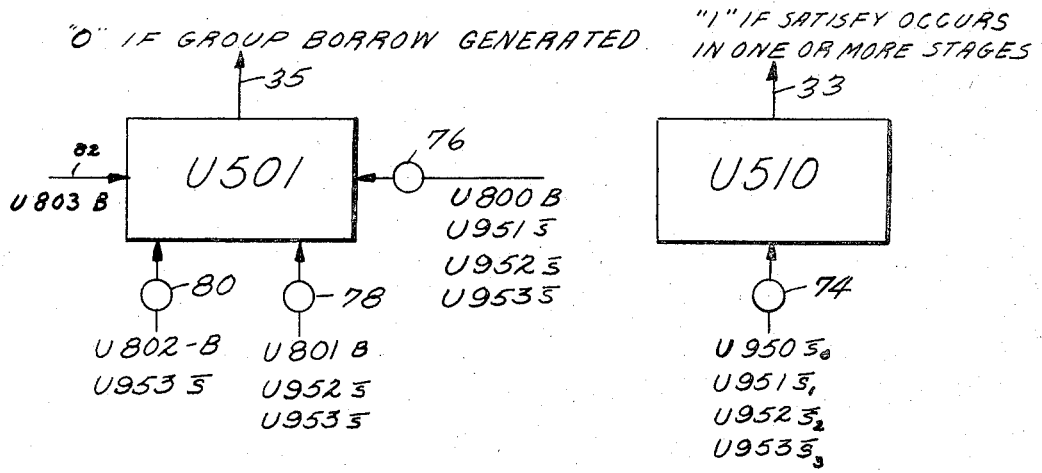
FIGURE 5 illustrates in a logic diagram the details of the group borrow and satisfy inverters of FIGURE 3.

The outputs of the individual FF's of feeder registers U–1 and U–2 of rank 20 are inputs to the group borrow inverter and the group satisfy inverter of rank 30. FIGURE 5 illustrates the rank 30 inverters associated with group 0. To aid in explanation of the operation, references will be made to FIGURE 4 and FIGURE 5. Referring to FIGURE 5 and specifically to inverter U510, the output of U510 will be "1" if a satisfy occurs in one or more of stages 0 to 3. This may be proven by first considering the inputs into the stage 0 individual FF of feeder register U–2 of FIGURE 4. Assume the first bits in stage 0 of the X and A registers are "11," which, as shown in case 4, is a satisfy. The $\overline{\text{addend}}$ X000 would be "0" and would be applied to line 12″ of FF U850. The $\overline{\text{augend}}$ A000 would be "0" and would be applied to line 14″. The control 15 conditions AND gates 16″ and 18″ thereby applying inputs to the set input of FF U850. The output of inverter U850 is a "1" which appears at clear output line 29, indicating that a satisfy is present at this stage. Further, the output of the inverter U950 appears at the set output line 27 and is a "0" indicating that a satisfy is present at this stage. Since S output of inverter U850 is a "1," $\overline{S}$, the output of inverter U950, is a "0." Referring to FIGURE 5 and inverter U510, the output of inverter U950 as an input $\overline{S}$ into AND gate 74 is a "0." The other inputs include outputs from the other U–2 feeder register FF's wherein U951($\overline{S}_1$), U952($\overline{S}_2$) and U953($\overline{S}_3$) are the set outputs from stages 1, 2 and 3 of group 0 and will be "1's" unless the respective individual stages have a satisfy. Summarizing, if one or more of the four inputs into AND gate 74 is a "0," the AND gate is not enabled. If the AND gate is disabled, inverter U510 receives a "0" input and produces a "1" output on line 33 indicating a satisfy in one or more stages.

The borrow inverter of rank 30 in FIGURE 5 is U501. Inverter U501 checks stages 0 to 3 to see if the group will generate a group borrow. The conditions wherein a group borrow will be generated are, (a) if a borrow occurs in the highest stage of the group and (b) if a borrow is generated in a stage other than the highest stage of the group and there are no satisfies present in any higher stages. If a borrow is generated, the output of inverter U501 is a "0."

A group borrow will not be generated if a stage borrow can be satisfied within a group, or if the highest stage present within the group does not generate a borrow.

Referring now to FIGURE 4, assume that the stage 0 U–1 feeder register FF U800 receives inputs wherein the addend is "0" and the augend is "0," which as shown in case 1 is a borrow. The addend "0" is applied to line 12' at input X100 and the augend "0" is applied to line 14' at input A100. The control 15 conditions AND gates 16' and 18' thereby applying "0" inputs to the set input of FF U800. The output of inverter U800 is a "1" appearing at clear output line 25, which output indicates that a borrow is generated at this stage. Also, the output of inverter U900 is a "0," which output appearing at set output line 23 indicates that a borrow is present, since B, the output of inverter U800, is a "1" and $\bar{B}$, the output of inverter U900, is a "0."

Referring now to FIGURE 5, specifically borrow inverter U501, the inputs to AND gate 76 include the output from the stage 0 U–1 feeder register FF U800, which, as assumed, is a "1," and outputs from stages 1, 2 and 3 U–2 feeder registers FF U951, U952 and U953 (see FIGURE 3) which indicate if a certain higher stage will satisfy a borrow. Assuming that the not-satisfies ($\bar{S}$) in each higher stage 1, 2 and 3 are "1's," i.e., no stage can satisfy a borrow, since the input U800(B), U951($\bar{S}$), U952($\bar{S}$) and U953($\bar{S}$) are all "1's," the AND gate is enabled and a "1" input is applied to inverter U501, thereby producing a "0" on output line 35. This "0" output indicates that a group borrow is generated, as required by the assumption that stage 0 receives "0" augend and addend inputs from the A and X registers. The input to AND gate 78 receives a borrow input U801(B) from stage 1 and not-satisfies U952($\bar{S}$) and U953($\bar{S}$) from stages 2 and 3. If a borrow is generated in stage 1 and is not satisfied in stages 2 and 3, all inputs to AND gate 78 are "1's" thereby applying a "1" input to inverter U501 producing a "0" output which indicates a group borrow. Similarly, AND gate 80 receives inputs from stage 2 borrow U802(B) and stage 3 not-satisfy U953($\bar{S}$). This AND gate checks if a borrow generated in lower stage 2 can be satisfied in higher stage 3, and if not, the output of U501 is "0" indicating a group borrow is generated. The last input into U501 is from stage 3, U803(B). If a borrow is generated in the last stage of the group, a direct "1" input into the borrow inverter, via line 82, is applied to U501 inverter. The "0" on output 35 indicates a group borrow is generated. When a condition is encountered wherein a stage borrow is satisfied or where the highest group stage does not generate a borrow, none of the AND gates is enabled and the output of U501 is a "1" indicating that no group borrow is generated.

Summarizing, the inverters U501 and U510 may have four output combinations:

(1) U501="0"   (2) U501="1"   (3) U501="0"   (4) U501="1"
    U510="1"       U510="0"       U510="0"       U510="1"

These output depend upon the borrows, satisfies and enables generated within the group.

The remaining three groups 1, 2 and 3 not shown, have similar logical arrays for determining group borrows and satisfies within rank 30 of the pyramid.

Figure 6:
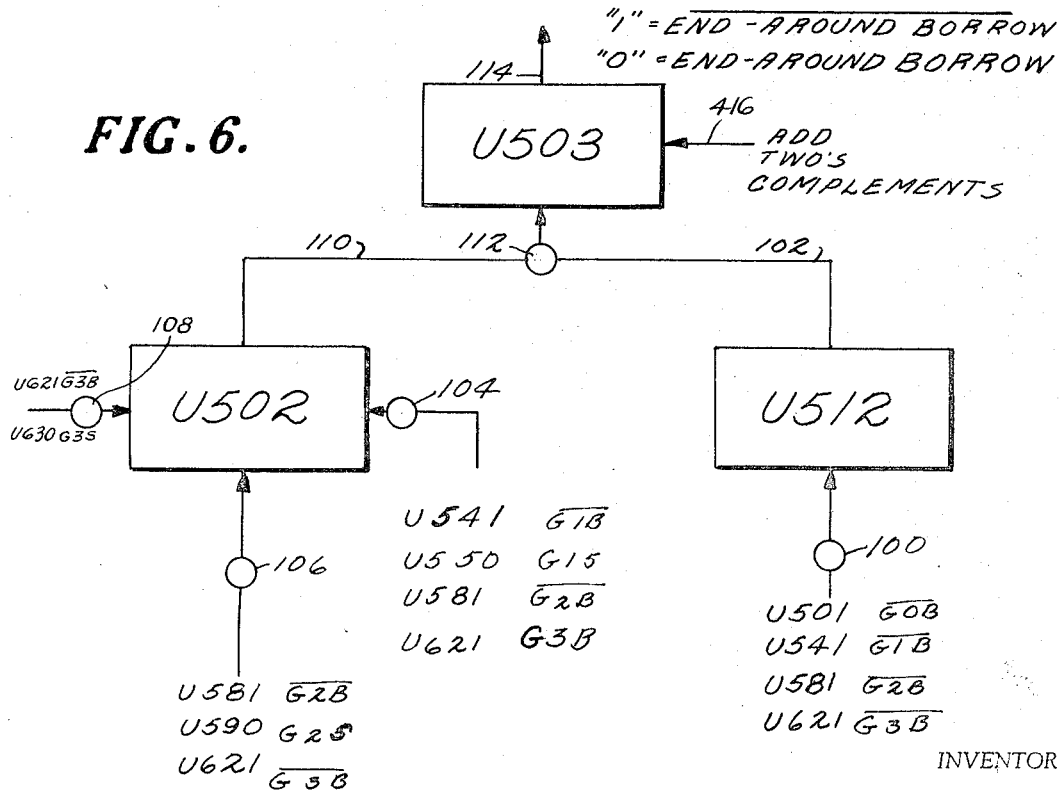
FIGURE 6 illustrates in a logic diagram the end around borrow inverter of FIGURE 3.

The outputs of all the borrow and satisfy inverters are applied to rank 40 inverter U503 to generate the end-around borrow; if one is necessary. FIGURE 6 illustrates the inverters associated with U503 and these are identified as U512 and U502.

An end-around borrow will generated if (a) a borrow is generated in a lower stage and is not satisfied or (b) if a borrow is generated in the last group, group 3. Referring to FIGURE 5, the output of the group 0 borrow generator inverter U501 is applied to inverter U512 via AND gate 100. This input is identified as U501($\overline{G0B}$). Similarly, the outputs of groups 1, 2 and 3 borrow generator inverters are applied to the AND gate 100 and are identified U541($\overline{G1B}$) for group 1; U581($\overline{G2B}$) for group 2 and U621($\overline{G3B}$) for group 3. Assuming all inputs are a "1," i.e., no group borrows are generated, the AND gate 100 is conditioned and passes a "1" to inverter U512 producing a "0" output on line 102. The output on line 102 is then applied to AND gate 112. If any of the inputs to U512 are a "0," thereby not conditioning AND gate 100, as a result of a group borrow being generated, the output of U512 is a "1" which partially conditions AND gate 112. Under these conditions, inverter U502 becomes important since it determines if a group borrow which has been generated can be satisfied. If it cannot, a "1" will be applied to condition AND gate 112 thereby applying a "1" to inverter U503. When U503 produces a "0" output on line 114, this indicates that a end-around borrow is generated.

Referring specifically to U502, the AND gate 104 receives inputs from the group borrow and group satisfy inverters of group 1, U541($\overline{G1B}$) and U550(G1S) and inputs from the group borrow inverters of group 2 and 3 U581($\overline{G2B}$) and U621($\overline{G3B}$), respectively. If a group borrow is generated in group 0, group 1 satisfy input U550(G1S) will determine if this borrow can be satisfied. If it cannot be satisfied, this term will be a "0" thereby not allowing the AND gate 104 to pass a "1." If groups 1, 2 or 3 generate a borrow, the other terms U541, U581 or U621 will be "0" thereby not allowing AND gate 104 to pass a "1."

The AND gate 106 determines (a) if a group borrow generated in a group lower than group 2 can be satisfied in group 2 or (b) if a group borrow has been generated in group 2 or in a higher group. If an unsatisfied borrow in the lower groups 0 or 1 cannot be satisfied, the term U590(G2S) is a "0" which fails to condition AND gate 106. If group 2 can satisfy a borrow from a lower group, the term U590 is a "1" partially conditioning AND gate 106 which then makes the gate dependent upon the other two terms. If a group borrow is generated in group 2 or group 3, terms U581($\overline{G2B}$) or U621 will be a "0," thereby preventing the AND gate 106 from passing a "1."

The last AND gate 108 determines (a) if a borrow generated in a lower group can be satisfied in group 3 or (b) if group 3 will generate a borrow which will then generate an end-around borrow. If a borrow is generated in a lower stage and is not satisfied, term U630(G3S) will determine if this borrow can be satisfied. If group 3 cannot satisfy a borrow, the term U630 will be a "0," which prevents conditioning of AND gate 108. If the term U630 is capable of satisfying a borrow, it will be a "1" thereby partially conditioning the AND gate 108. If a group borrow is generated in group 3 and this borrow is not satisfied therein, the term U621($\overline{G3B}$) is a "0" thereby preventing conditioning of AND gate 108. If the term U621 is a "1," indicating no group borrow in group 3, the AND gate is conditioned to pass a "1" if the term U630 is a "1." If "0's" are applied to inverter U502 from AND gates 104, 106 and 108 the output "1" from U502 is applied over line 110 to AND gate 112.

Summarizing, inverter U512 determines if a group borrow or group borrows are generated. If no group borrows are generated the output of inverter U512 is a "0" which is applied to line 102. If one or more group borrows are generated, the output of U512 will be a "1" which is applied to line 102. If a group borrow is generated in any group as indicated by a "1" output from U512, inverter U502 then determines whether a borrow generated in a lower group can be satisfied in a higher group. If the borrow generated in a lower group can be satisfied in higher groups, the output of U502 will remain "0." If a borrow generated in a lower group cannot be satisfied in a higher group, or if a group borrow is generated in the highest group, the output of inverter U502 will be a "1." The output from inverter U512 is applied via line 102 to AND GATE 112 together with the output 110 from inverter U502. There are four possible combinations applied to AND gate 112:

(1) U512="0"    (2) U512="0"    (3) U512="1"    (4) U512="1"
    U502="0"        U502="1"        U502="0"        U502="1"

In combinations 1, 2 and 3 the AND gate 112 is not conditioned thereby passing a "0" to inverter U503 producing a "1" output indicating no generated end-around borrow. In combination 4, the AND gate 112 is conditioned thereby passing a "1" to inverter U503 which thereby has a "0" output indicating that an end-around borrow is generated. The output from inverter U503 is applied upon line 114 which is the output from rank 40.

The output from U503 is applied to inverter U504 as shown in FIGURE 7. The output of U504 is subsequently applied to the rank 50 stage borrow inverters. Rank 50 stage borrow inverters determine whether (1) an end-around borrow has been generated which has not been satisfied in some lower stage or (2) a borrow has been generated in some lower stage which has not yet been satisfied by any stage. Referring to rank 50 of FIGURE 7, each inverter with the exception of U505, receives inputs from two sources; first from the feeder registers of rank 20, and second, from inverter U504 controlled by inverter U503. Stage 0 inverter U505 input is simply from the inverter U504. Inputs to stage 1 inverter U515 include an output from feeder register FF U800($B_0$) of stage 0 and the input from AND gate 122. The AND gate 122 inputs are from inverter U504(EB) and from feeder register FF U850 inverter U950($\overline{S}_0$). Inverter U515 determines if an end-around borrow has been generated, i.e., when U504 is a "1," and if that borrow has been satisfied in stage 0. If the borrow has not been satisfied in stage 0, U950($\overline{S}_0$) is a "1" conditioning AND gate 122. If the end-around borrow has been satisfied in stage 0, the term U950 is a "0" preventing the conditioning of the AND gate 122. The second determination made by inverter U515 is whether stage 0 has generated a borrow. If a borrow has been generated in stage 0, the term U800($B_0$) is a "1." If a borrow has not been generated, U800 is a "0." A "1" input to inverter U515 produces a "0" output indicating the presence of the above conditions and lack of satisfaction thereof.

Stage 2 inverter U525 has three inputs, one more than stage 1. This inverter determines if any of the conditions below is present. The first condition is whether an end-around borrow has been satisfied in a lower stage. This is accomplished by AND gate 124 having inputs U504 (EB), U950($\overline{S}_0$) and U951($\overline{S}_1$). The operation of the AND gate is similar to the of stage 1 with the further step of determining if stage 1 could satisfy the end-around borrow. A second condition is determined by AND gate 126. This condition is whether a borrow generated in stage "0" has been satisfied in stage 1. The term U800($B_0$) is a "1" if a borrow is generated in stage 0 and term U951($\overline{S}_1$) is a "1" if the borrow cannot be satisfied by stage 1. If both terms are a "1," the AND gate 126 is conditioned to pass a "1." A third condition is when stage 1 generates a borrow. The term U801($B_1$) is a "1" if the borrow has been generated. Any "1" input to inverter U525 indicates that a borrow or end-around borrow remains unsatisfied.

Stage 3 inverter U535 determines if four conditions are present. The AND gates 128, 130 and 132 determine conditions that are similar to those of stage 2. The conditions are checked to see if they have been satisfied in stage 2. If they have not, one of the AND gates passes a "1." The reasoning associated with the condition of each term of the AND gate is the same as indicated above.

Summarizing, an unsatisfied borrow or end-around borrow is determined by the inverters of rank 50. When an unsatisfied borrow or end-around borrow exists, the outputs of the UXX5 inverters are "0." The outputs of the UXX5 inverters are applied to the inverters of rank 60.

Rank 60 comprises two levels of inverters, level 1 and level 2 as illustrated in FIGURE 7. Level 1 includes the UXX6 series inverters and level 2 includes the UXX7 series inverters. The outputs of the level 1 inverters are applied to, and control, the level 2 inverters. The outputs of the level 2 inverters, UXX7 series, contain the final outputs from the pyramid. The rank 60 inputs emanate from two sources; from the feeder register FF of rank 20 (see FIG. 3) and the output of the UXX5 inverters of rank 50. The functioning of rank 60 can be best understood by considering the two levels concurrently. The discussion considers only the inverters of group 0 as this group is representative.

Assume the output of inverter U505 of rank 50 is a "0" indicating an unsatisfied borrow input of either the end-around or lower stage generated type. The output from U505 is carried by line 132 to AND gate 146, the output of which is directed to inverter U507. A second line 134 is connected to line 132 at point 133. Line 134 applies the output signal of U505 to the inputs of AND gates 136 and 138, the outputs of which are respectively connected as inputs to inverter U506. AND gate 136 receives a second input from inverter U800($B_0$) of stage 0 U–1 feeder register FF U800 of rank 20. AND gate 138 receives a second input from inverter U805($S_0$) of U–2 feeder register FF U850 of rank 20. Since the "0" output of U505 is applied to AND gates 136 and 138, both AND gates are disabled. The disabled AND gates apply "0" inputs to inverter U506. The output of inverter U506 is a "1" applied to line 142. Line 142 applies the output of U506 to AND gate 144, the output of which is an input to inverter U507. A second line 148 is connected to line 142 at point 140. Line 148 applies the output of U506 to AND gate 150, the output of which is also an input to inverter U507. A third line 147 is connected to line 148 at point 145. Line 147 applies the output of U506 to AND gate 146, the output of which serves as a third input to inverter U507. Therefore, each of the three AND gates 144, 146 and 150 has "1" input partially conditioning them. AND gate 144 has an additional input from inverter U800($B_0$) of rank 20. To AND gate 150 there is an additional input from inverter U850($S_0$) of rank 20. As stated previously, AND gate 146 receives a second input from inverter U505 via line 132. If a borrow or a satisfy is present in stage 0, either term U800 or term U850 is a "1." If either term is a "1," either AND gate 144 or AND gate 150 is conditioned producing a "1" input to inverter U507. A "1" input applied to inverter U507 produces a "0" output appearing on line 152. AND gate 146 is disabled by the "0" output from inverter U505. If neither a borrow nor a satisfy is generated in stage 0, all AND gates will be disabled applying a "0" input to inverter U507. A "0" input to inverter U507 produces a "1" output appearing on line 152.

Considering now the case where the output of inverter U505 of rank 50 is a "1" indicating the absence of an unsatisfied borrow input, this output is applied to the AND gates 136 and 138 of inverter U506 partially conditioning them. The remaining terms of the AND gates then determine whether they are enabled. If a borrow or a satisfy is present in stage 0, either term U800 or term U850 is a "1." If one term is a "1," either AND gate 136 or 138 is conditioned producing a "1" input to inverter U506. A "1" input applied to inverter U506 produces a "0" output appearing on line 142. A "0" output on line 142 disables AND gates 144, 146 and 150 of inverter U507. When all AND gates are disabled, a "0" input is applied to inverter U507. A "0" input applied to inverter U507 produces a "1" output appearing on output line 152. If neither a borrow nor a satisfy is generated at stage 0, both AND gates 136 and 138 of inverter U506 are disabled thereby applying a "0" input to inverter U506. A "0" input applied to inverter U506 produces a "1" output. The "1" output of U506 partially conditions AND gates 144, 146, and 150. Since term U800 of AND gate 144 and term U850 of AND gate 150 are both "0," disabling their respective gates, only AND gate 146 is conditioned by the "1" from U506 and the "1" from U505. A "1" is passed by AND gate 146 and applied to inverter U507. A "1" input to inverter U507 produces a "0" output appearing on output line 152.

Summarizing, the final outputs of inverters UXX7 may may be tabulated as follows:

|  | Augend Addend | Complement Addend & Subtract | Sum at UXX7 |
| --- | --- | --- | --- |
| "0" Output From UXX5 | 0 +0 | 0 −1 | =0 |
|  | 0 +1 | 0 −0 | =1 |
|  | 1 +0 | 1 −1 | =1 |
|  | 1 +1 | 1 −0 | =0 |
| "1" Output From UXX5 | 0 +0 | 0 −1 | =1 |
|  | 0 +1 | 0 −0 | =0 |
|  | 1 +0 | 1 −1 | =0 |
|  | 1 +1 | 1 −0 | =1 |

The final outputs of inverter stages UXX7 may be determined by either of two rules: first, if a stage has an unsatisfied borrow input, that is a "0" output from UXX5, caused by either an end-around borrow or a borrow generated in some lower stage, the stage has a final output equal to that obtained by forming the logical sum of the addend and augend of a pyramid stage. Second, if the stage does not have a borrow input, that is a "1" output from UXX5, caused by all borrows generated being satisfied or the absence of borrows which need not be satisfied, the stage has an output equal to that obtained by forming the complement of the logical sum of the addend and augend of a pyramid stage.

The overall operation of the pyramid will be best understood by means of a sample problem. Two fifteen bit quantities will be selected to illustrate the pyramid operation. The lower four order bits will be used to illustrate a group operation and the other eleven bits are assumed to be a "0." Assume the following example and refer to FIGURES 1a, 3 and 4.

Augend=0011
Addend=0110
Sum=1001

The addend is in the X register and the augend is in the A register. The inputs to rank 20 are as follows:

|  | Stage 3 | Stage 2 | Stage 1 | Stage 0 |
| --- | --- | --- | --- | --- |
| U-1 Feeder Register | X103=0 A103=0 | X102=0 A102=1 | X101=1 A101=1 | X100=1 A100=0 |
| U-2 Feeder Register | X003=1 A003=1 | X002=0 A002=0 | X001=0 A001=0 | X000=0 A000=1 |

The outputs of the feeder registers U-1 and U-2 are as follows:

|  | Stage 3 | Stage 2 | Stage 1 | Stage 0 |
| --- | --- | --- | --- | --- |
| U-1 Feeder Register | U803=1 U903=0 | U802=0 U902=1 | U801=0 U901=1 | U800=0 U900=1 |
| U-2 Feeder Register | U853=0 U953=1 | U852=0 U952=1 | U851=1 U951=0 | U850=0 U950=1 |

Since the output of U803 is a "1," a stage borrow is present in stage 3. Similarly, the output of U851 is a "1" indicating a satisfy in stage 1. This may be proven by referring back to FIGURES 3 and 4 and repeating the logic of binary addition in the "1's" complement described previously. If the addend is complemented and subtracted from the augend, the result illustrates which stage has a borrow, satisfy or enable. For example:

Augend=0011
Addend=0110

Complementing the addend:

Stages 3210
Augend=0011
Addend=1001
———
BESE

Stages 0 and 2 are enable stages, stage 1 is a satisfy stage and stage 3 generates a borrow. Referring to the feeder register outputs, the "1" output of U803 indicates a borrow in stage 3 and a "1" output from U851 indicates a satisfy in stage 1.

The output of rank 20 is applied to rank 30 (see FIG. 3). Referring specifically to the group satisfy inverter U510, the term U951 is a "0" causing the output of inverter U510 to be a "1" indicating that a satisfy is present in one of the stages of group 0. Referring to the group borrow inverter U501, term U803 is a "1" producing a "0" output from inverter U501 indicating that a group borrow is generated in group 0. The outputs from rank 30 are applied to the inverters of rank 40. The term U501 of inverter U512 is "0" producing a "1" output from inverter U512. Since the terms of the higher groups are all "0" inverter U502 output is also a "1." Both inputs to the AND gate of U503 are "1's" producing a "0" output from inverter U503 indicating an end-around borrow. The output of U503 is applied to inverter U504 producing a "1" output from U504. The "1" output from U504 is then applied to U505 producing a "0" output. A "0" output of U505 indicates an unsatisfied borrow input as stated previously. Combining the outputs of the rank 20 registers and U505, the outputs of rank 50 inverters are as follows:

| Stage 3 | Stage 2 | Stage 1 | Stage 0 |
| --- | --- | --- | --- |
| U535=1 | U525=1 | U515=0 | U505=0 |

Utilizing these outputs and the outputs of the rank 20 registers, the conditioning of the AND gates to the rank 60 inverters is determined as previously described. Consequently, the output of inverters of level 1 of rank 60 are as follows:

| Stage 3 | Stage 2 | Stage 1 | Stage 0 |
| --- | --- | --- | --- |
| U536=0 | U526=1 | U516=1 | U506=1 | and the output of level 2 inverters of rank 60, constituting the final sum, are as follows:

| Stage 3 | Stage 2 | Stage 1 | Stage 0 |
| --- | --- | --- | --- |
| U537=1 | U527=0 | U517=0 | U507=1 |

The functioning of the U pyramid with two fifteen bit operands is similar to the above example with the exception that all the FF's and inverters are utilized. All operations occur in parallel through each rank. Therefore the quantities proceed through each rank step by step and the final sum appears and is retained at the final output inverters. A successive operation of the pyramid may be commenced after clearing the feeder register FF's.

*Logical sum*

The U pyramid can perform the logical sum of the augend and the addend. FIGURE 7 shows the rank 50 stage borrow UXX5 series inverters and rank 60 UXX6 and UXX7 inverters, the latter being the final output level. The rank 50 UXX5 inverters have additional inputs from line 200. Line 200 is the control that determines the logical sum operation. FIGURE 8 illustrates the U609 FF utilized in executing the logical sum command. The command to form a logical sum is applied as a "1" to the set input line 300 of U609 FF. The FF is set and inverter U609 produces a "0" output on the clear output line 304. This "0" is applied to slave inverter U719 producing a "1" output on line 200. The "1" output on line 200 (see FIGURE 7) is applied to each inverter of rank 50; specifically via line 202 to inverter U505 of stage 0; via line 204 to inverter U515 of stage 1; via line 206 to inverter U525 of stage 2 and via line 208 to inverter U535 of stage 3. Each stage of the higher groups has a similar logical sum input.

When a "1" is applied to line 200, each UXX5 inverter produces a "0" output. Referring back to the rules for determining the output of the final inverter stages: if a "0" output from the UXX5 inverter is present, which is equivalent to every stage having an unsatisfied borrow input, the stage has an output equal to that obtained by forming the logical sum of augend and the addend of the pyramid stage. Referring to FIGURE 8, the U609 FF will remain set producing the logical sum command until the FF is cleared. The FF is cleared by applying a "1" to clear input line 302. When the FF U609 is cleared, the "1" output of inverter U609 is applied to the slave inverter U719. The "0" output of U719 is applied via line 200 to the UXX5 series inverters removing the logical sum command. Summarizing, the logical sum is obtained by applying a "1" input into each UXX5 inverter producing a "0" output. When the output of a UXX5 inverter is a "0," the stage has an output equal to that formed by the logical sum of its augend and addend.

*Add, two's complement*

The U pyramid is also capable of adding in the "2's" complement mode. FIGURE 9 illustrates the logic used in determining that the addition is to be in the "2's" complement mode. The logic essentially comprises two's FF's. The first is identified as the two's complement FF U600. The second is identified as the disable two's complement FF U608. The addition in the two's complement is performed by first applying a "1" to clear input line 412 of FF U608. The output of the clear output line 414 is then a "1" which is applied to AND gate 408. The command to add in the two's complement is a "1" applied to the set input line 402 of FF U600. The "1" set output of FF U600 is applied via line 406 to condition AND gate 408 applying a "1" to end-around borrow inverter U503 (see FIG. 5). The "1" input produces a "0" output from inverter U503 appearing on output line 114. This is equivalent to an end-around borrow. In this case the pyramid simulates a two's complement pyramid. Since a characteristic of the two's complement mode of arithmetic is the presence of a forced end-around borrow, the U pyramid still performs the operations in the one's complement mode, however a forced end-around borrow is effectively added by means of an imaginary sixteenth stage to the pyramid. The bits in this imaginary sixteenth stage are both equal to zero and hence generate a borrow. The resulting 15 bit sum of the U pyramid is equivalent to the sum which would have been obtained from a true two's complement pyramid.

The U pyramid may be returned to operation in the one's complement mode in either of two ways. A first method is to apply a "1" to the clear input line 404 of FF U600. This produces a "0" on the set output line which disables AND gate 408. When the AND gate 408 is disabled, a "0" input is applied to inverter U503 allowing normal operation. A second method is to apply a "1" to the set input line 410 of FF U608 which sets the FF. When FF U600 sets, a "0" is produced on its clear output line which disables AND gate 408. When the AND gate 408 is disabled, a "0" input is applied to inverter U503 allowing normal operation.

*Subtraction*

Subtraction in the U pyramid is completed by proper entry of the subtrahend and the minuend into the rank 20 feeder registers. The pyramid does a true subtraction without complementing the minuend. The subtraction is performed by operation upon the true bit quantities. When the pyramid performs the subtraction, the following cases occur:

$$(1)\ \frac{0}{-0}\quad (2)\ \frac{1}{-1}\quad (3)\ \frac{0}{-1}\quad (4)\ \frac{1}{-0}$$
$$\overline{E}\quad\ \ \overline{E}\quad\ \ \overline{B}\quad\ \ \overline{S}$$

In all cases the pyramid looks at the true values, and the necessary borrows and satisfies are generated.

FIGURE 10 illustrates how the quantities are entered into stage 0 feeder registers of rank 20. The discussion will consider only a single FF, each of the U-1 and U-2 feeder registers and the use of the lowest order bit of the minuend and subtrahend. Referring to FF U800 of the U-1 feeder register, the minuend and the subtrahend are transferred from the A and X register respectively to the feeder registers in the proper sequence by means of well known logical configurations. The subtrahend X100 is applied to line 600 and the minuend A100 is applied to line 602. AND gates 604 and 606 are conditioned by control 614 applying the quantities to the set input of FF U800. If the minuend and subtrahend have the bit quantities of case 3, the U800 FF remains cleared and the clear output 610 is a "1" indicating a borrow.

Referring to FF U850 of the U-1 feeder register, the subtrahend X000 is applied to line 620 and the minuend A000 is applied to line 622. AND gates 624 and 626 are conditioned by control 634 to pass the quantities applied thereto to the set input of U850. If the minuend and the subtrahend have the bit quantities as shown in case 4, the U850 FF remains cleared and the clear output 632 is a "1" indicating a satisfy.

Once the information is entered into the feeder registers, it flows up through the pyramid in the normal manner. The final output inverter series UXX7 gives the true difference between the original subtrahend and minuend.

The final outputs from the inverter series UXX7 may be determined by two rules: (1) If a stage has an input from an unsatisfied end-around borrow or a borrow from some lower stages, the stage is set to the opposite of the quantity which is obtained in a logical subtraction. (2) If a stage does not have an input from an unsatisfied end-around borrow or a borrow from some lower stage, the stage is set to the same quantity which is obtained in a logical subtraction.

The subtraction of two 15 bit quantities is performed in parallel. The pyramid performs a true subtraction of the quantities. The subtraction command is integrated with the method of entering the quantities into the individual feeder register FF's. Once the information is entered, it flows through each pyramid rank in the normal manner displaying the true difference between the minuend and the subtrahend at the final output inverters.

*48 bit a adder*

The basic philosophy of the U pyramid may be incorporated in a 48 bit borrow pyramid. This pyramid is a 48 stage inverter network capable of forming the sum $X+A$. A 48 bit operand is contained within the X register and also within the A register. Both the X and A registers have FF's identical to, and identified by a similar numbering sequence, that of the U pyramid. The adder has a further capability of forming the sums of $X+A/2$, $X+A/4$ and $X+2A$. This borrow pyramid may be labeled the A adder. A second adder identical to the A adder, which may be identified as a Q adder, can be coupled with the A adder to form a 96 bit borrow pyramid capable of forming the sum of two 96 bit operands.

In either the A or Q adder, all additions are performed in the one's complement mode utilizing the identical method of addition as that of the U pyramid. The 48 bit operand is subdivided into sections, groups and stages as shown in FIGURE 11, the sections being numbered 0–2, the groups 0–11 and the stages 0–47.

The operation of the A adder is dependent upon the passing of the 48 bit quantities contained within the X and A registers to the adder feeder registers. FIGURE 12 shows the ranks through which the quantities pass within the adder. The input to the adder is applied to rank A–20 feeder register FF's, only one stage of which is illustrated. The addend X and the augend, which may be A or $A/2$ or $A/4$ or $2A$, are applied to feeder register FF A2XX series. The gating combination through which the inputs are passed is identical to the gating as described in the U pyramid. The series A2XX FF's in the lowest order stage illustrated are numbered beginning with A200 as shown. The not addend, or $\overline{addend}$, $\overline{X}$ and the not augend, or $\overline{augend}$, $\overline{A}$ or $\overline{A}/2$ or $\overline{A}/4$ or $\overline{2A}$, are applied to the feeder register FF A2XX series inverters beginning with A250. The output line A–22 from rank A–20 is applied to the group borrow and satisfy inverters of rank A–30. Output A–22 is carried via line A–24 to rank A–60, and via lines A–24 and A–26 to rank A–50. The rank A–30 satisfy inverters are identified as the AXX0 series and the group borrow inverters are identified as the AXX1 series. The output line A–32 of rank A–30 is the input to rank A–40. In rank A–40, the section borrow and satisfy inverters are identified as the AXX1, AXX2, AXX3 series inverters. The output line A–42 of rank A–40 is the input to rank 50. Rank 50 has a second input A–26 that emanates from rank A–20 as previously set forth. The stage borrow inverters are identified as AXX5. The output line A–52 from rank A–50 is an input to rank A–60. A second input A–24 from rank 20 is also applied to rank A–60 as stated previously. The final output inverters of rank A–60 are identified as AXX6, AXX7. The output line A–62 to which the sum is applied serves as an input to rank A–70. The rank A–70 inverters are identified as AXX8. The output on line A–72 from rank A–70 is the complement of the sum at rank A–60. The rank A–70 inverters are identified as AXX8.

The most significant difference between the pyramid of the adder and that of the U pyramid occurs at rank 40. The U pyramid has an end-around borrow inverter whereas the A adder has section borrow and satisfy inverters at the corresponding rank. This difference is necessary primarily because of the length of the bit quantities. In rank 40 of the U pyramid, the end-around borrow inverter determines if a borrow is generated which cannot be satisfied by a lower group satisfy. The rank A–40 of the A adder determines if one or more sections generates a borrow. Each section's borrow and satisfy inverters determine if: (1) A section borrow is generated in a lower or higher section which is not yet satisfied; and (2) if the section itself generates a section borrow which cannot be satisfied in any other section.

FIGURES 13a–g are composite illustrations of the entire adder pyramid. FIGURE 13h shows the rank A–20 feeder register FF's for stage 0. In the A adder, the feeder registers of the first level are identified as A200 through A247 and the feeder registers of the second level are identified as A250 through A297. Referring to FIGURE 13h, the stage 0 A200 FF of level 1 receives inputs from the A and X register FF's. The inputs to A200 include X100, the addend, and A100 the augend. These inputs are from register FF's identical to those of the U pyramid, the only exception being the length thereof. The set output of the FF is A300. The clear output of the FF is A200. The clear output is applied to a delay network A400 which serves to delay without inverting. The level 2 A250 FF receives inputs from the X and A registers shown as X000, the $\overline{addend}$, and A000, the $\overline{augend}$. The set output line of A250 FF is A350 and the clear output line is A250. The clear output of the FF is also applied to a delay network A450. The feeder registers determine if a borrow, satisfy or enable is present in exactly the same manner as that of the U pyramid. The numbering sequence of the higher order FF's of rank A–20 is numerically increased by one for each additional stage. For example, stage 1 level 1 FF inverters are A201, A301 and the corresponding delay network is A401.

The outputs of the feeder registers are applied to the rank A–30 group borrow and satisfy inverters. Also the outputs are applied to the ranks A–50 and A–60 inverters as shown in FIGURES 13b–g. In FIGURE 13a, inverter A510 of group 0 is representative of a satisfy inverter and inverter A501 is representative of a group borrow inverter, these inverters comprising rank A–30. The inputs to each inverter are determined in the same manner as set forth in the description of the U pyramid. If the output of a group satisfy inverter is a "1," a group satisfy is present. If the output of a group borrow inverter is a "0," a group borrow is generated. Again the notations are similar to those illustrating the same conditions in the corresponding inverters of the U pyramid. The outputs of the rank A–30 group borrow and satisfy inverters serve as inputs to the section satisfy and borrow inverters.

Figure 13E:
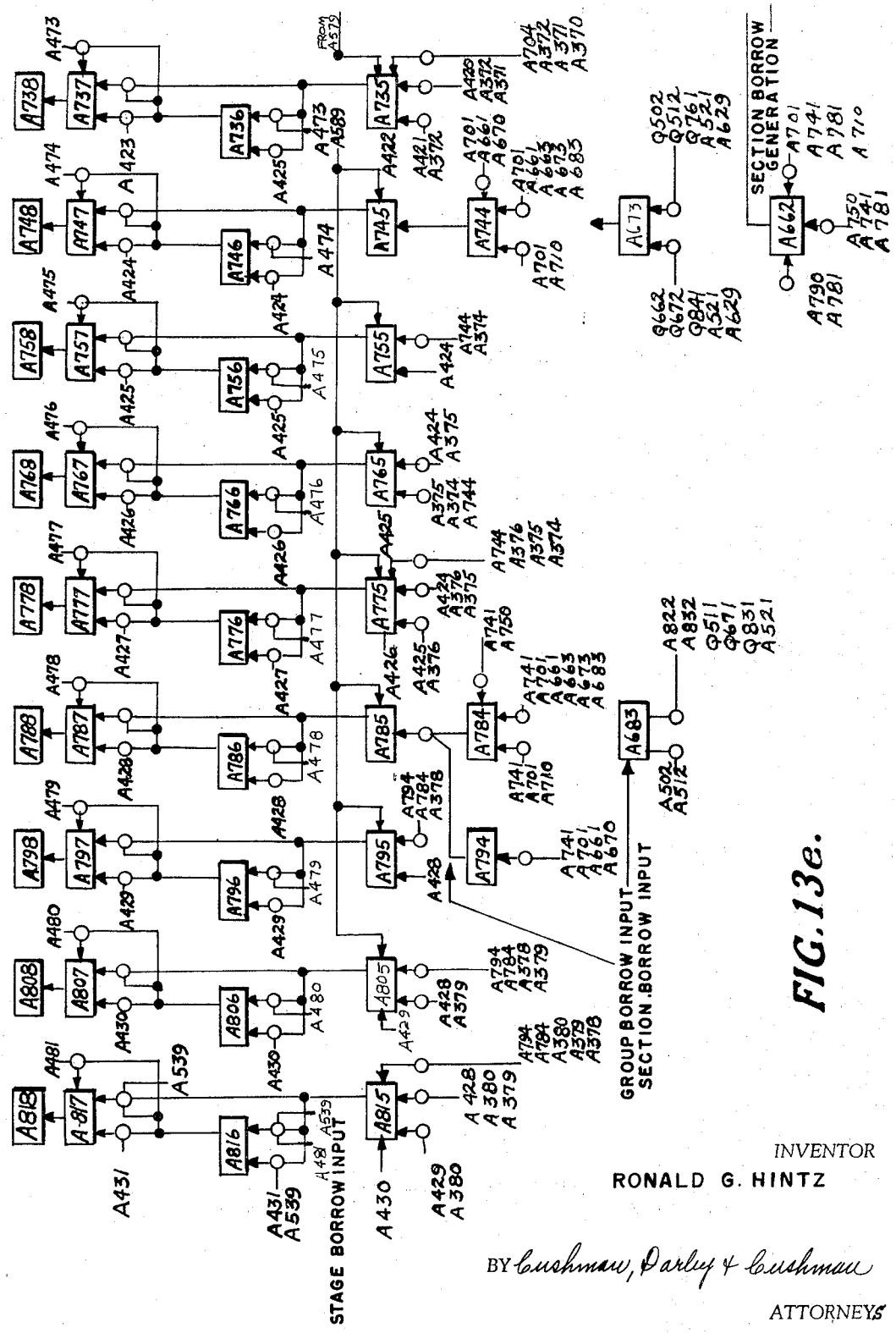

Since the rank A–40 of the A adder is the most significant variation from the U pyramid, this will be considered in detail. The satisfy inverters of each section comprise two inverters. Section 0 of FIGURE 13b will be selected as a typical section for purposes of discussion. FIGURE 14a and 14b illustrate the two satisfy inverters associated with section 0. Inverter A521 of FIGURE 14a determines if one or more groups within section 0 generates a satisfy. Input A510(G0S), from group 0 satisfy inverter, is a "1" if a group 0 satisfy is present. Similarly if any of the outputs of A550(G1S), A590(G2S) or A630(G3S) is a "1," this indicates a group satisfy within the respective group. A "1" from any group satisfy inverter to A521 produces a "0" appearing on output line 802, which output indicates a section satisfy. The output of A521 is subsequently applied to section 2 borrow inverter A673 as shown in FIGURE 13e. Inverter A673 performs a similar function to that of A513 of section 0 which function will be discussed hereinafter. The second inverter A761 of FIGURE 14b determines if a satisfy is present in section 1 and/or section 2. Referring to inverter A761, the inputs from section 1 group satisfies are A670(G4S), A710(G5S), A750(G6S) and A790(G7S). The inputs from section 2 group satisfies are A830(G8S), A870(G9S), A910(G10S) and A950(G11S). If any of the above inputs are "1" the output of A762 is a "0" appearing at line 804. The output of A761 is applied to inverter A503 of the section 0 borrow generator.

The inverter A503 of FIGURE 15a determines if a group borrow generated within a group of section 0 is satisfied within that section or by satisfies generated in sections 1 and 2. The inputs to inverter A503 are determined by two AND gates 832 and 854. The inputs applied to AND gate 832 are from inverter A512 via line 830, from inverter A502 via line 836 and from AND gate 852 via line 850. Considering first the inverter A512, this inverter determines if a group borrow is generated within the section. AND gate 826 receives inputs from each group borrow; specifically A501($\overline{G0B}$), A541($\overline{G1B}$), A581($\overline{G2B}$) and A621($\overline{G3B}$). If any group of the section generates a borrow, that term of the above inputs is a "0" disabling AND 826. The input applied to inverter A512 via line 820 from AND gate 826 is a "0" which produces a "1" output from A512 indicating that a group borrow is generated. The output from A512 is applied to AND gate 832 via line 830. A second inverter A502 determines if a borrow which is generated in a lower group is satisfied within that group, and if not, if that borrow can be satisfied in a higher group of the section. If a borrow is generated within a group and that borrow is not satisfied by any group within that section, the output of inverter A502 is a "1." The first AND gate 838 receives inputs from the group 1 satisfy inverter A550(G1S), and from the group borrow inverters A541($\overline{G1B}$), A581($\overline{G2B}$), and A621($\overline{G3B}$). If a group borrow is present in any group, that group borrow term is a "0" which disables the AND gate 838. Further, if no group borrows are generated within groups 1, 2 or 3 and if group 1 does not have a satisfy capable of satisfying a borrow generated in group 0, the A550 term is a "0" disabling AND gate 838. The input from AND gate 838 is applied to inverter A502 via line 840. The AND gates 842 and 846 perform a function similar to that of the last AND gate. The remaining two groups 2 and 3 are checked by AND gate 842 to determine the presence of a borrow. This is accomplished by terms A581($\overline{G2B}$) and A621($\overline{G3B}$). Also group 2 is checked to determine if a borrow generated in a lower group can be satisfied. If a satisfy is present, term A590(G2S) is a "1." If a borrow is generated in either group, or if a satisfy is not present, the appropriate term is a "0" disabling AND gate 842. The output of AND gate 842 is applied to inverter A502 via line 844. The last input to inverter A502 is from AND gate 846. The two inputs to this AND gate are from group 3 inverters. Term A621($\overline{G3B}$) if from the group 3 borrow inverter and is a "0" if a group borrow is generated in group 3. The second term A630(G3S) is from the group 3 satisfy inverter and is a "1" if a group satisfy is present. If either of the two above terms is a "0," the AND gate 846 is disabled. The output of the AND gate is applied to inverter A502 via line 848.

When all three of the AND gates connected to inverter A502 are disabled, "0" inputs are applied to the inverter. The "0" inputs produce a "1" output from A502 appearing on line 836. This output is subsequently applied to AND gate 832.

The third input to AND gate 832 includes several AND inputs, Q511, Q671, Q831 and A761. The inputs are from the Q adder and from A761. The Q terms will be considered to be "1's" during 48 bit operations. The A761 term will be a "0" if a satisfy occurs in one or more groups of sections 1 and 2. The function of the above inverters will be discussed in detail hereinafter. The AND inputs are applied to AND gate 832 via line 850.

Summarizing, AND gate 832 receives three inputs: the first from inverter A512 via line 830, the second from inverter A502 via line 836, and the third from the AND input via line 850. When all three inputs are "1," which conditions are determined as hereinbefore described, AND gate 832 is conditioned applying a "1" to the inverter A503 via line 853.

Inverter A503 receives a second input from AND gate 854. The terms Q502, Q512, Q761 inputs to AND gate 854 are from the Q adder and are considered "1's" in accordance with the above discussion. The term A719 is a special function term that is a "0" disabling AND gate 854. This special function term will be discussed in detail hereinafter. The "0" output of AND gate 854 is applied to inverter A503 via line 856.

When either AND gate 832 or 854 is conditioned to pass a "1" input to inverter A503, the output of A503 is a "0" applied to line 858. A "0" output from inverter A503 indicates the generation of a section borrow. The output of A503 is applied to the final inverter ranks as shown in FIGURES 13b and c.

Referring to FIGURE 15b, borrow inverter A513 determines if a borrow, generated in section 1 is satisfied in section 1; and also determines if the borrow generated in section 1 is satisfied in section 2. If a section 1 borrow is not satisfied by sections 1 and 2, the section borrow is applied to section 0. The inputs to AND gate 816 include the outputs from the section 1 borrow inverters A662 and A672, which determines whether an unsatisfied borrow is generated in section 1, input A841 from the section 2 satisfy inverter A841, and inputs from the Q adder for special operations. If AND gate 816 is conditioned, a "1" input is applied to inverter A513. The other AND gate 820 has applied thereto inputs from the Q adder; Q822 and Q832, and an input from the special inverter A719. The output from AND gate 820, which is "0" due to special term A719, is applied via line 822 to inverter A513. If the input applied to inverter A513 is a "1" due to enabling of gate 816, a "0" output from inverter A513 to line 824 is obtained to indicate that the section borrow generated in section 1 has not been satisfied in sections 1 and 2.

Referring to FIGURE 15c, inverter A523 determines if a borrow is generated in section 2 which is not satisfied in section 2. If the condition exists, the borrow is applied to section 0, and that borrow is satisfied in section 0 or carried forward to the higher sections. The inputs to an AND gate 806 include terms A822 and A832 from section 2, which terms indicate the presence of an unsatisfied borrow generated therein, and inputs from the Q adder, the function of which will be explained hereinafter. All the inputs from the Q adder will be considered as "1's" to condition the AND gates. The inputs to AND gate 810 include inputs from the Q adder, Q822 and Q832 and input A719. Input A719 is considered as "0" disabling the AND gate to which it is applied. These inputs to gate 810 perform special functions which will be discussed in detail hereinafter. If either of AND gates 806 or 810 is conditioned to pass a "1," the "1" is applied to inverter A523 via line 808 or 812 respectively. A "0" output indicates a section borrow which must be satisfied in either section 0 or a higher section.

Sections 1 and 2 have the same logical configurations, sub-divided into groups, as those just described with reference to section 0. Since each section determines the presence of satisfies and borrows relative to the other sections, the necessary borrows are carried or enabled from one section to other sections until they are satisfied. FIGURES 13a–g illustrate the entire pyramid including the stage FF's, group and section inverters, the input terms to each inverter and specifically how the final output inverters are arranged to produce the final sum.

The final output inverters function in the same manner as those of the U pyramid. The rank A–50 and A–60 inverters generate the final outputs after the necessary borrows are satisfied. The inputs to rank A–50 include inputs from the rank A–20 feeder registers and from the rank A–40 section borrow and satisfy inverters. The final sum appears in rank A–60 and is retained until the feeder registers of rank A–20 are cleared. The inverters of rank A–70 are used to generate the complement of the sum ($\overline{sum}$). Thus by applying the two 48 bit operands within the X and A registers to the borrow pyramid, the addition of the two quantities is performed within the borrow pyramid by the passing of the quantities through the pyramid ranks. The sum of X+A appears at the pyramid output in two values; the first is the sum of X+A, and the second is the complement of the sum $(\overline{X+A})$. By means of small modifications within the pyramid and by controlling the input operands, a variety of applications involving the borrow pyramid may be performed. The following variations and modifications discussed hereinafter illustrate some applications.

48 bit add $(X+A/2, X+A/4$ and $X+2A)$

The borrow pyramid can perform the addition of X, the addend, and fractional portions of A the augend. The performance of a special addition is dependent upon how the addend is applied to the feeder registers inputs. Generally, the value of a quantity can be increased or decreased by shifting the entire quantity one or more stages to the right or to the left.

When the sum of $X+A/2$ is desired, the quantities X and A/2 are transferred to the feeder register FF A2XX series beginning with A200. Also the quantities $\overline{A/2}$ and $\overline{X}$ are transferred to the feeder register FF's beginning with A250. The quantities A/2 and $\overline{A/2}$ are obtained by right shifting the contents of the A register one stage. This shift is accomplished when the quantities are transferred from the A register to the feeder registers. The right shift is logically accomplished by gating the set and clear sides of the A register FF's into the FF's one stage to the right of the corresponding FF's in the A200 and A250 feeder registers. For example, stage 47 of the A register is applied to the FF's of stage 46 in the feed registers.

Similarly, if the sum of $X+A/4$ is desired, the quantities X and A/4 are transferred to the feeder registers beginning with A200. Also the quantities $\overline{A/4}$ and $\overline{X}$ are transferred to the feeder registers commencing with FF A250. The quantities A/4 and $\overline{A/4}$ are obtained during the transfer from the A register to the feeder registers by right shifting the quantity two stages. This shift is accomplished in a logical manner similar to that employed to obtain A/2 and $\overline{A/2}$ with the exception of the amount of shift.

The sum of $X+2A$ is obtained after transfer of the quantities X and 2A to the feeder registers beginning with FF A200. The terms $\overline{X}$ and $\overline{2A}$ are also transferred to the feeder registers starting with FF A250. The quantities 2A and $\overline{2A}$ are obtained by shifting the quantity in the A register one stage to the left. This shift is accomplished when the quantity is being transferred from the A register to the feeder registers. The left shift is logically accomplished by gating the set and clear sides of the A registers FF's one stage to the left of the corresponding FF's in the A200 and A250 feeder register. For example, stage 0 of the A register is applied to the FF's of stage 1 of the feeder registers.

48 bit subtract

The A adder can subtract two 48 bit quantities. The subtraction operation requires the use of an independent register in which the subtrahend is initially stored. This register may be designated as the M register. The minuend is placed in the A register. The contents of the M register are complemented and entered in the X register. The contents of the X and A registers are then entered into the appropriate feeder registers. This sequence applies the operands to the feeder registers in the same manner illustrated in FIGURE 10 applicable to the U pyramid. During pyramid operation, the A adder looks upon the quantities coming into the feeder registers as if an addition is to be performed, i.e., as if the addend has been complemented and subtracted. Therefore, during subtraction, the net effect of complementing the subtrahend before it is entered into the feeder register is that the second complement produces true values. When the true values are applied to the feeder registers, the pyramid then performs a subtraction rather than an addition. The output of the final inverter rank contains the true difference between the minuend originally placed in the A register and the subtrahend originally placed in M register.

48 bit logical sum

The A adder also has the capability of forming the logical sum of the 48 bit quantities. The quantities are applied to the feeder registers in identically the same manner as in an addition. The AXX5 level inverters are influenced to produce the logical sum as will be described. FIGURE 16 illustrates the logical array for conditioning the pyramid to produce the logical sum. A A609FF is set by an instruction applied to line 902 requesting the logical sum. When the FF sets, the set output line 904 applies a "1" to inverters A519 via line 906, A529 via line 908, A539 via line 910, and to Q519 via line 912. The "0" output of inverter A519 is applied via line 914 to inverters A599, A589, A579, A569, A559 and A509. The "1" outputs of these inverters are then applied to the AXX5 inverter rank. Similarly, the "0" output of A529 is applied via line 916 to Q inverters Q509, Q599, Q589, Q579, Q569 and Q559. The "1" output of these inverters is applied to the QXX5 inverter rank of the Q adder. Referring to the "1" outputs of the A5X9 inverters, when the "1" is applied to the AXX5 inverters, this is equivalent to every stage of the AXX5 inverter rank having a borrow input resulting in a condition similar to that described with reference to the U pyramid. Consequently, the final logical sum of the operands appears at the AXX7 inverter rank. Similarly, the Q5X9 inverters are employed when a logical sum is executed in the Q adder.

49th bit in the A adder

Now that the principal logic of a 48 bit A adder has been described, the adder must be considered from an operative point of view. During a normal 48 bit operation, the A adder performs its operation on a conventional 48 bit number. A conventional 48 bit number comprises a 47 bit word plus a sign bit. Under some special operations, the sign bit is eliminated and the 48 bit number thereafter is packed to contain a special 48 bit word. This special 48 bit word could be the result of the addition of two conventional 48 bit numbers. Also during a multiplication process as set forth, in a copending patent application Serial No. 285,490, now abandoned, by James E. Thornton entitled "High Speed Multiplication Device" filed concurrently herewith, a conventional 48 bit quantity comprising of a 47 bit word is added to the special 48 bit quantity comprising of a 48 bit word. Therefore, when it is desired to combine this two 48 bit numbers, the sum can be a 49 bit length word. Thus it is necessary to provide additional arrangements for processing and registering the 49 bit number which may be generated by the addition of two 48 bit numbers.

This is accomplished by providing a 48th stage FF only in the A200 feeder register. This stage is utilized in determining the borrow characteristics of section 2 and is not involved in the satisfy logic. If a 48th stage FF was utilized within the A250 feeder register, that FF would always be set. This condition would exist because the 49th bit pair would always be either a 00 or a 01. When either condition is applied to a A250 feeder register FF, this FF would set. Thus the A250 feeder register does not require a 48th stage FF.

Figure 13F:
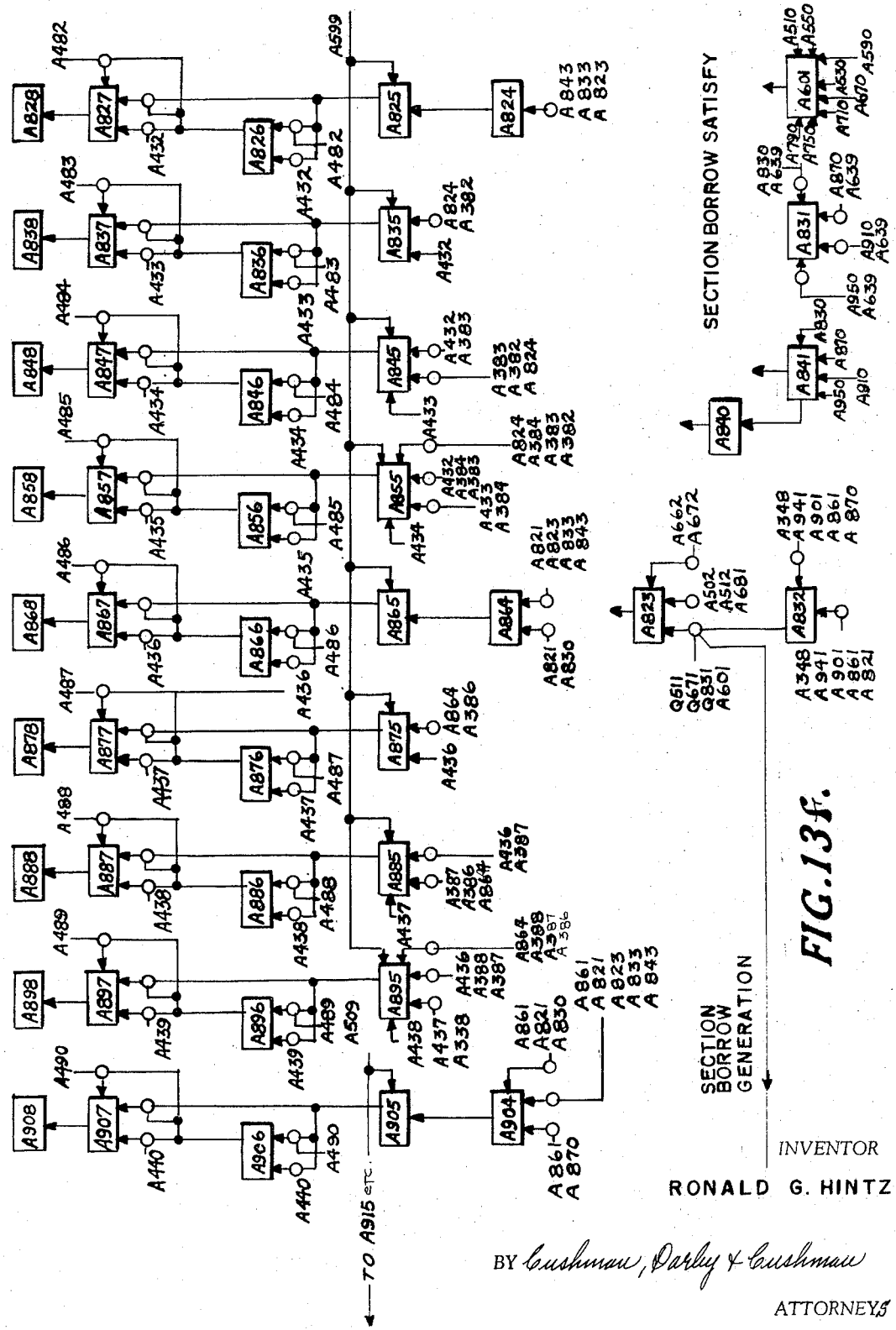

In FIGURE 17, there is illustrated the 48th stage FF of the A200 feeder register. Since in the addition of two 48 bit words the inputs to the inverter A248 of this FF are "0's," the FF remains cleared with a "0" on its set output line, the output of inverter A348. This indicates that section 2, which now includes the 48th stage, generates a borrow. Therefore, the set output of FF 248 is applied to the section 2 borrow generation inverters A822 and A832 (FIG. 13f). The outputs of A822 and A832 in the same manner as the equivalent portion of section 1. The inverter A823 resolves whether the borrow generated in section 2 can be satisfied in any of the sections.

If the section 2 borrow cannot be satisfied in sections 1 and 2, the output of A823 is a "0." This output is directed to inverter A944 (FIG. 13g) which assists in controlling the highest order inverter group of section 2, including that of stage 48, in conjunction with the output of inverter A954. The outputs of A944 and A954 are each a "1" if a group 3 of section 2 has a borrow input.

Stage 48 and A–50 inverters A985 and A995 determine the output from rank A–60 stage 48 inverters. The outputs of A985 and A995, illustrated in FIGURE 18, are each a "1" if stage 48 does not have a borrow input. Conversely, the outputs of A985 and A995 are each a "0" if stage 48 has a borrow input.

The outputs from the rank A–60 inverters may be determined as follows:

(1) When bit 49 is a "1" and stage 48 has a borrow input indicated by a "0" out of A985 or A995, the output of A987 of rank A–60 will be a "0."

(2) When bit 49 is a "0" and stage 48 has a borrow input indicated by a "0" out of A985 or A995, the output of A987 of rank A–60 will be a "0."

(3) When bit 49 is a "1" and stage 48 does not receive a borrow input indicated by a "1" out of A985 and A995, the output of A987 of rank A–60 will be a "0."

(4) When bit 49 is a "0" and stage 48 does not receive a borrow input indicated by a "1" out of A985 and A995, the output of A987 of rank A–60 will be a "1."

A second adder having identical logical configuration identified as the Q adder, operates in exactly this same manner. Since the A adder and the Q adder are separate and independent, it is possible to combine the two separate 48 bit adders to form a 96 bit adder. The modification necessary to accomplish this is quite minor as will be discussed. It is important to note that the 49th bit in the A adder or the Q adder is a special function of each separate adder and cannot be utilized to form a combined larger adder.

*Interconnected 48 bit adders*

A and Q adders may be interconnected in AQ or QA combinations to operate using "1's" complement arithmetic on bit sums, differences, products, or quotients during certain arithmetic operations having lengths greater than the capacity of a single adder. An illustration of such use may be seen in a copending patent application Serial No. 285,490 by James E. Thornton entitled, "High Speed Multiplication Device," filed concurrently herewith. In this device two 48 bit numbers are multiplied by an arrangement in which a pair of adder pyramids are employed each operating independently to produce a pair of final partial products. The adder pyramids are then combined to add these partial products. Since each operand is 48 bits in length, the final product, formed by adding partial products, is 96 bits in length. By merging the two pyramids, the addition required to produce the 96 bit sum may be performed.

When lengthy addition is to be performed, the A and Q adders are coupled together as shown in a simplified logical diagram in FIGURE 19. This coupling is accomplished by means of an adder control 1002. FIGURE 20 shows the adder control in detail, the operation of which will be considered hereinafter. The output from the adder control appears on line 1004. Line 1004 carries the output to condition AND gates 1006 and 1010 which merge the A and Q adders. When AND gate 1006 is conditioned, information passes from section 2 of the A adder to section 0 of the Q adder through line 1008. Similarly, when AND gate 1010 is conditioned, information passes from section 2 of the Q adder to section 0 of the A adder via lines 1012. The $A_A$ register contains the upper part of operand B and the $A_Q$ register contains the lower part of operand B. The $X_A$ register contains the upper part of operand A and the $X_Q$ register contains the lower part of operand A. The control C allows AND gates 1020, 1022, 1024 and 1026 to pass the operands from the registers to the feeder registers. The upper part of operands A and B are passed to the A200, A250 feeder registers and the lower parts of operand A and B are passed to the Q200, Q250 feeder registers. The A200, A250 feeder registers then commence addition by passing their quantities into the remaining portions of the A adder. Simultaneously, the Q200, Q250 feeder registers pass their quantities into the remaining portion of the Q adder for addition. As the addition is performed within the pyramids, borrows are propagated from the highest stage of the Q adder to the lowest stage of the A adder via line 1010. Similarly, borrows are propagated from the highest stage of the A adder to the lowest stage of the Q adder. The final sum is then placed in the $A_AA_Q$ registers which had previously contained operand B. The sum may be placed in the $A_QA_A$ registers by appropriately controlling the transfer of the adder outputs to the opposite adder registers.

FIGURE 20 illustrates the logical configuration of the adder control 1002 for enabling the coupling of the individual adders to form an expanded adder. A merge, or combine, add instruction is applied to 1030 set input line of FF A619. This instruction sets the FF producing a "1" on its set output line 1032 and a "0" on its clear output line 1034. The "0" output is applied to inverters A629, A639, Q629, Q639 and Q649 producing "1" outputs from each. The outputs of these control inverters are applied to the section borrow and satisfy inverters of each adder. Referring to FIGURES 13a–g, several inverters of the A adder have terms which emanate from the Q adder. Also the set output A719 from the add control FF, the outputs of the control inverters connected to the FF clear output A619, and the clear output term A619 serve as input terms to the various AND gates of the borrow and satisfy inverters of the A adder. As an example of how the coupling is accomplished between the adders, reference is made to inverter A511 of section 0 illustrated in FIGURE 21. When the control FF A619 sets the output of inverter A719 is a "1" which partly conditions AND gates 1060, 1062, 1064 and 1066 of the section 0 satisfy inverter A511. Thereafter, the output of the inverter is dependent upon the presence of a group satisfy. Sections 2 and 3 each have inverters which perform similar functions as is illustrated in FIGURE 13a. Also, as stated previously, the Q adder is identical to the A adder. Each term in the Q adder is identified as QXXX corresponding to each term in the A adder identified as AXXX. Referring now to the section 0 borrow inverter A523, as illustrated in FIGURE 15c, AND gate 806 has two terms from the A adder, A822 and A832, and three terms from the Q adder, Q511, Q671, and Q831. Noting term Q511, this term is located in section 0 of the Q adder and is identical to the A511 section 0 satisfy term hereinbefore described. Also Q671 is from section 1 of the Q adder and Q831 is from section 2 of the Q adder. Reviewing the input terms to AND gate 806, A822 and A832 determine if a borrow is generated in, and satisfied within, section 2 of the A adder. Since the A adder is coupled to the Q adder enabling the operation of the Q terms, the borrow in section 2 of the A adder must be passed completely through the Q adder unsatisfied before section 0 of the A adder can attempt to satisfy it. If the A adder were independent and separately operating, an unsatisfied borrow generated in section 2 of the A adder would be applied to section 0 of the A adder. Since the Q adder and A adder are coupled, the borrow from section 2 of the A adder must be applied to the section 0 of the Q adder. Therefore, terms Q511, Q671 and Q831 determine if section 0, 1 and 2 of the Q adder can satisfy a borrow from section 2 of the A adder. If the Q adder cannot satisfy the borrow, all the terms are "1's" conditioning AND gate 806. The "1" would be applied to inverter A523 via line 808 producing a "0" output indicating a section borrow.

Summarizing, when the add control FF A619 sets to produce "1" outputs from the add control inverters, certain terms within each adder's section borrow and satisfy inverters are conditioned to logically determine the relationship between the six sections so that a section borrow generated in section 2 of the A adder becomes an end-around borrow entering section 0 of the Q adder instead of section 0 of the A adder. Similarly, a section borrow generated in section 2 of the Q adder enters section 0 of the A adder.

Since this inter-relationship of borrows exists, arithmetic functions having greater lengths than the capacity of a single arithmetic unit may be accomplished by merging a plurality of units in the manner described.

*Normalize system*

When the format of the data which the computer is to process is in the floating point decimal system, it becomes necessary to normalize the data. When using the normalized floating point system, the absolute value of the data in the floating point system is determined by multiplying a coefficient times the base 2 raised to the power denoted by an exponent. Employing a 48 bit quantity as an example, it is assumed that the operand contains the sign exponent and coefficient in the following format: the highest order 12 bits denote the sign and the exponent, and the lower order 36 bits contain the coefficient of the number, which combination is illustrated in FIGURE 22a. After an arithmetic operation, the number must be normalized into the standard format. Specifically normalizing a number requires that the coefficient be shifted a determined number of stages placing the highest and most significant bit in stage 35. This normalize is performed utilizing the binary system. Generally the normalize process requires the following steps: (1) determining in which stage the most significant bit of the coefficient is located, (2) determining how many stages that coefficient must be right shifted to place the first "1" bit of this quantity in stage 35, (3) inserting the number of right shifts necessary in a shift counter, and (4) transmitting the unnormalized quantity to a shift network. The separate shift network performs the right shifts, obtaining the desired final floating point format. The normalize network comprising a portion of this invention determines steps (1) and (2) of the above process. Utilizing the borrow pyramid disclosed herein, these two steps are accomplished by means of the feeder registers and satisfy and borrow inverters of the adder in combination with a normalize inverter matrix. Steps (3) and (4) of the process is performed by any well known counter and shift network.

Since the A and Q adders may be combined as previously described, it becomes possible to have 96 bit length quanities. The normalize network can easily perform its operation upon the 96 bit length quantities, but certain conditions are imposed upon the method of processing them. When the $A_A$ and $Q_A$ registers contain the 96 bit quantities, only the length of the coefficient may be expanded. FIGURE 22b illustrates the format of 96 bit length word. The $A_A$ register contains the sign and the exponent in the highest order stages. The coefficient is contained within stages 0 through 35 in the $A_A$ register and stages 0 to 47 in the $Q_A$ register. Since the length of the coefficient is expanded, and further since only right shifts are made, it is possible to shift the coefficient 95 stages decimally or 140 stages octally to normalize the quantity.

FIGURE 23 illustrates in a simple logical configuration how the normalize network determines the number of right shifts necessary to normalize an operand. It is assumed that an unnormalized 96 bit floating point number is to be normalized. This unnormalized number may be, for example, the result of a prior arithmetic operation. Before the unnormalized number is placed in the $A_A$ and $Q_A$ registers, the exponent and the sign bits are removed from the 96 bit quantity. The exponent and the sign are retained in a separate register to be recombined with the shifted coefficient later in the sequence. The stages which contained the exponent are replaced with "0's." A further known condition imposed when operating in the floating point system is that the highest stage to which the most significant bit of the coefficient can progress to is stage 36 of the $A_A$ register. If the most significant bit of the coefficient is in stage 36, only a single right shift is necessary to normalize the quantity. However, if the most significant bit appears within stage 34, a 96 bit right shift is necessary to place the bit in stage 35. Utilizing the assumed quantity, a 96 bit unnormalized quantity with the exponent and sign bits removed, the quantity is first placed in the $A_A$ and $Q_A$ registers. It is then passed from the $A_A$ and Q registers via lines 2002 and 2004 respectively to AND gates 2006 and 2008. The AND gates are conditioned by control 2010 to pass the quantity to the feeder registers of the adders. The contents of the $A_A$ register are applied to the A200 and A250 feeder registers. The contents of the Q register are applied to the Q200 and Q250 feeder registers. The outputs of the A200 and A250 feeder registers are connected to the normalize inverter matrix via line 2012 and to the satisfy-borrow logic of the A adder, via line 2014. Similarly, the outputs of the Q200 and Q250 feeder registers are applied to the normalize inverter matrix via line 2018. The outputs from the Q200 and Q250 feeder registers are also applied to the satisfy-borrow logic of the Q adder by line 2020. The outputs of the satisfy-borrow logic of both the A and Q adders are applied to the normalize inverter network by lines 2016 and 2022 respectively. The normalize inverter network determines at what stage the most significant "1" is located and produces at output line 2024 the right shift count necessary to normalize the number. The normalize network comprises five levels of inverters which by proper gating selection and translating determines the right shift count as will be explained hereinafter.

Referring now to FIGURE 24, the arrangement for transferring information into stage 0 of the A feeder register is shown. Referring back to FIGURE 1b, the A register FF at stage 0 has a clear output from inverter A000 and a set output form inverter A100. If a "0" is contained within stage 0 of the A register, the FF remains cleared. The output of A100 is a "0" and the clear output of inverter A000 is a "1." The clear output is applied to the stage 0 satisfy FF of the A250 feeder register. The set output from A100 is applied to the stage 0 FF of the A200 feeder register. Referring to FIGURE 24, the "1" output from A000 is applied via line 2030 to AND gate 2032. The AND gate is conditioned by the control C passing the "1" to FF A250 causing it to set. When FF A250 sets, a satisfy is indicated. The clear output of FF A250 is a "0" on line 2034. The "0" output from A100 is applied via line 2036 to AND gate 2038. This AND gate is conditioned by control C passing a "0" to FF A200 allowing it to remain cleared. When FF A200 is cleared, a borrow generated is indicated on its clear output line 2040. Each stage of the $A_A$ and $Q_A$ registers is joined to its respective stage FF of the adder feeder registers in this manner.

Referring to FIGURE 13a–g, the stage borrows and satisfies generated by the feeder registers are applied in the normal manner to the group satisfy and borrow inverters. The outputs of the group satisfy and borrow inverters are applied to the section satisfy and borrow inverters. The normalize network, logically illustrated in FIGURES 25a–c, utilizes inputs from the stage FF's, and the group and section borrow and satisfy inverters.

Referring to FIGURES 25a and b, the outputs from the section satisfy inverters from the A and Q adders are applied to the JXX0 inverter rank. This rank essentially determines in what section the most significant "1" occurs. This determination is accomplished by a checking means which simultaneous checks every section and determines in which section of the six utilized, the most significant bit occurs. When the section is determined, the appropriate JXX0 inverter is used for ANDing purposes within its associated section and all other terms serve to disable the remaining sections from consideration. The checking means then proceeeds to determine in which group of the significant section, and finally in which stage of the determined group, the most significant "1" occurs. When the appropriate section has been determined, a "0" is applied to proper JXX0 inverter. The "1" output of this JXX0 inverter is applied to AND gates; which control the JXX1 group determining inverters. The appropriate group AND gate is conditioned by outputs from the various group borrow outputs. For example, referring to FIGURE 25a and assuming that section 1 of the A adder contains the most significant "1," A840 is a "0" (the complement of A841 section 2 A adder satisfy which is a "1") and A681 is a "0" (that is, one of the group satisfies is a "1").

The "0" inputs from A840 and A681 are applied to inverter J820 producing a "1" output. The "1" output partially conditions the AND gates to the inverters JXX1 rank which are the group checking inverters. These groups inverters for section 1 of the A adder are J821, J841, J861 and J881 for groups 4, 5, 6 and 7, respectively. All other JXX0 terms receive "1" inputs and produce "0" outputs disabling the group inverters of all other sections. As illustrated, the highest section in which the first "1" occurs controls. Section O of the Q adder JXX0 term is controlled by all six sections since it is the lowest section in priority. Inverter J500 therefore requires that the five preceding sections all be "0" before it can contain the most significant bit. Referring again to the section 1 of the A adder, each AND gate to a JXX1 group checking inverter is conditioned by outputs from the group borrow inverters of that section. To continue the example, assume the most significant bit in section 1 occurs in group 4, i.e., the group associated with the J821 inverter. With a "1" on a stage FF of this group, the group satisfy FF is set and the borrow FF remains clear. Consequently, the remaining group satisfy inverters also remain clear producing "0" outputs. The AND gate to the J821 inverter has three inputs which are inverted group satisfy outputs and which indicate that the other three groups 5, 6 and 7 do not have a satisfy being generated, and since the most significant bit is in this section, it must be in group 4. (This may be proven by following through the logical diagrams of the pyramid in FIGURES 13a-g.) The AND gate is therefore conditioned passing a "1" to J821 producing a "0" output. Referring now to the adder A group 4 stage inverters, J664, J674, J684 and J694 of FIGURE 25a, since J821 is producing a "0" output, the output from the stage inverters is dependent upon the other input terms to the stage inverters. All of the stage inverters of the JXX4 series other than those of group 4 are producing a continuous "0" output due to the "1" input from their respective group JXX1 inverters. As set forth previously, the AND gate inputs to the JXX1 terms are conditioned only if that group has the most significant bit. Since all the other groups are incapable of fulfilling this condition, their AND gates are disabled applying "0's" to the group inverters JXX1. Therefore, the "1" outputs of the JXX1 inverters are continually applied to their respective stage inverter except when that group contains the most significant bit.

Since the group containing the most significant "1" has been determined, the appropriate stage must be selected. Referring now to stage inverters J664, J674, J684 and J694 of stages 16, 17, 18 and 19, assume for purposes of discussion that stage 16 contains the most significant bit. The inputs to J664 include the clear outputs from stages 17, 18 and 19 to satisfy FF and the set output from stage 16 satisfy FF. As stated previously, if the bit in the A register is a "0," the satisfy FF of the A feeder register is set producing a "1" on the set output line and a "0" on the clear output line. Since stages 17, 18 and 19 do not have a "1" bit, the "0" clear outputs from the satisfy FF are applied to the J664 inverter. Conversely, the set output lines from each satisfy FF is applied to its respective JXX4 term. For example, stage 19 set output A369 from stage 19 feeder register FF is a "1" causing J694 to produce a "0" output disabling that stage. Similar conditions are obtained at stages 17 and 18. The last input to J664 is the set output from the stage 16 feeder register satisfy FF. Since this FF is clear due to the bit being a "1," the clear output A356 is a "0." Each term into J664 is now a "0" which causes the inverter to produce a "1" output. Every other JXX4 term produces a "0" output as described hereinbefore.

The outputs of the JXX4 stage inverter terms are applied as OR inputs to the JXX5 series inverters as illustrated in FIGURE 25c. Each input is a "0" unless that term emanates from the stage inverter corresponding to the stage which contains the most significant bit. Following the assumption that stage 16 inverter J664 is producing a "1" output, the JXX5 rank inverters J855, J725, J665, and J545 receive a "1" input from J664. Inverters J855, J725, J665 and J545 produce a "0" output. The "0" outputs are to be applied to the JXX6 rank inverters disabling the AND gates to the appropriate inverters. The inputs to the JXX6 inverter AND gates are usually a "1" resulting from the "0" inputs into the JXX5 rank of inverter. When a term into a JXX6 inverter becomes a "0," that AND gate is disabled. The "0" applied to the JXX6 inverter produces a "1" output. The output of the JXX6 inverter determines the translated right shift count in binary format. Referring to the example, the input terms J855, J725, J665 and J545 are "0" which disable AND gates and cause a "0" to be applied to inverters J846, J636, J626 and J506. Since the output of the JXX6 terms is the right shift count in binary format, the final output count is 1 001 101, which is $115_8$ or $77_{10}$. Therefore, a right shift of $77_{10}$ places is necessary to place the most significant "1" bit in stage 35 of the A register to normalize the quantity. The unshifted quantity is transferred to a shift network, which networks are well known in the computer art, where the number of right shifts as determined necessary by the normalize network are performed. Subsequently when the coefficient has been shifted, it is recombined with the exponent and sign bits, which were removed and stored as an earlier part of the cycle, to complete the normalize sequence.

It will be understood that any appropriate high speed borrow generating network may utilize the inventive borrow pyramid having simultaneous borrow generation and improved normalization.

The above illustrative embodiment comprises a preferred embodiment of the invention. However, this illustration is not intended to limit the possibilities of insuring the features of the borrow pyramid having simultaneous borrow generation. The borrow pyramid having simultaneous borrow generation and the improved normalize network is an example of an arrangement in which the inventive feature of this disclosure may be utilized and it will become apparent to one skilled in the art that certain modifications may be made within the spirit of the invention as defined by the appended claims.

What is claimed is:

1. The combination of at least two borrow pyramids having simultaneous borrow generation to develop a sum having at least twice the length of that which a single pyramid is capable of producing and wherein each pyramid is of the type having a plurality of sequentially occurring logic ranks including: a first logic rank having input means for receiving in combination two operands and their complements, said input means generating a borrow or a satisfy if ether are present for each operand digit combination; a second logic rank connected to the first logic rank, said second logic rank having checking means to group said first logic rank generated borrows and satisfies; a third logic rank connected to said second logic rank, said third logic rank having checking means to determine which generated satisfy will satisfy a generated borrow; a fourth logic rank which is connected to the third logic rank and to the first logic rank, said fourth logic rank having enabling means to allow the generated borrows to be satisfied by the determined generated satisfy; a fifth logic rank which is connected to the fourth logic rank and to the first logic rank, said fifth logic rank having a final output means to jointly merge the satisfied borrow of the fourth rank with the generated borrows and generated satisfies of the first rank; the improvement comprising: add control means connected between the third logic ranks of separate pyramids and selectively conditioned to merge said third logic ranks to permit the third logic rank checking means of each pyramid to be conditioned by the presence of generated borrows and generated satisfies of another pyramid, whereby the results of each said pyramid third logic rank conditions the fourth logic rank enabling means and the fifth logic rank final output means to produce a final sum which is at least twice the length of the sum which can be produced by a single pyramid.

2. A combination as set forth in claim 1 wherein the add control means includes a logic arrangement comprising a plurality of inverters and a bi-stable flip-flop.

3. A normalizer network for use in a digital computer comprising in combination two borrow pyramids having simultaneous borrow generation, each of said borrow pyramids comprising a first logic rank having input means for receiving an operand, said input means generating a borrow or a satisfy if the operand digit is a "0" or a "1"; a second logic rank connected to the first logic rank, said second logic rank having checking means to group said first logic rank generated borrows and satisfies; a third logic rank connected to said second logic rank, said third logic rank having checking means to determine which group satisfies of the said second logic rank are generating a group satisfy; a normalize inverter matrix, said normalize inverter matrix jointly connected to the first logic rank, the second logic rank and the third logic rank of each said borrow pyramid; said normalize inverter matrix including a plurality of logic levels, said logic levels connected jointly to the first, second and third logic ranks of each borrow pyramid; said logic levels having selecting means to determine the highest order operand digit containing a "1," said logic levels further having means to translate the said operand digit position into a right shift count, said right shift count appearing at the said normalize inverter matrix output.

4. A normalize network as set forth in claim 3 wherein the input means of the first logic rank comprises a double level logic arrangement of bi-stable flip-flops; the checking means of the second logic rank and the third logic rank include a plurality of single inverters; and the said logic level selecting means of the normalize network includes a plurality of single inverters.

5. A normalize network for use in a digital computer comprising in combination two borrow pyramids having simultaneous borrow generation, each of said borrow pyramids comprising an input means, said input means capable of receiving an operand, said input means further capable of generating a borrow or a satisfy if the operand digit is a "0" or a "1," a checking means connected to said input means, said checking means including means for determining the presence of borrows and satisfies; a normalize inverter matrix, said normalize inverter matrix jointly connected to said input means and said checking means, said normalize inverter matrix having selection and translating means; said selection and translating means determining the highest order operand digit containing a "1" and translating the said operand digit position into a right shift count, said right shift count appearing at the said normalize inverter matrix output.

6. A normalize network as set forth in claim 5 wherein the input means comprises a logical arrangement of bi-stable flip-flops; the checking means includes a plurality of single inverters arranged to provide a logical checking scheme, and the normalize inverter matrix selection and translating means include a plurality of single inverters.

References Cited by the Examiner
UNITED STATES PATENTS

| 3,198,938 | 8/1965 | Marette | 235—164 |
| 3,234,370 | 2/1966 | Erickson | 235—164 |

MALCOLM A. MORRISON, *Primary Examiner.*

ROBERT C. BAILEY, *Examiner.*

M. J. SPIVAK, *Assistant Examiner.*